(12) United States Patent
Hartman et al.

(10) Patent No.: US 8,910,208 B2
(45) Date of Patent: Dec. 9, 2014

(54) INTERACTIVE VIDEO SYSTEM

(75) Inventors: Anthony Hartman, Los Angeles, CA (US); George Shaw, Brookline, MA (US)

(73) Assignee: Anthony Hartman, Los Angeles, CA (US)

( * ) Notice: Subject to any disclaimer, the term of this patent is extended or adjusted under 35 U.S.C. 154(b) by 48 days.

(21) Appl. No.: 12/962,529

(22) Filed: Dec. 7, 2010

(65) Prior Publication Data

US 2011/0145881 A1 Jun. 16, 2011

Related U.S. Application Data

(60) Provisional application No. 61/267,403, filed on Dec. 7, 2009.

(51) Int. Cl.
| | |
|---|---|
| *H04N 7/14* | (2006.01) |
| *H04N 5/445* | (2011.01) |
| *H04N 7/173* | (2011.01) |
| *H04N 21/475* | (2011.01) |
| *H04N 7/15* | (2006.01) |
| *H04N 21/4788* | (2011.01) |
| *H04N 21/422* | (2011.01) |
| *H04N 21/4223* | (2011.01) |
| *H04N 21/443* | (2011.01) |

(52) U.S. Cl.
CPC ....... *H04N 21/4788* (2013.01); *H04N 21/4755* (2013.01); *H04N 7/15* (2013.01); *H04N 21/42203* (2013.01); *H04N 21/4223* (2013.01); *H04N 21/4438* (2013.01)
USPC ........................... 725/41; 725/118; 348/14.07

(58) Field of Classification Search
USPC ........................ 725/118, 41; 348/14.01, 14.07
See application file for complete search history.

(56) References Cited

U.S. PATENT DOCUMENTS

| | | | | |
|---|---|---|---|---|
| 5,453,780 | A  * | 9/1995  | Chen et al. .................. | 348/14.07 |
| 6,333,750 | B1 * | 12/2001 | Odryna et al. ................ | 345/629 |
| 6,339,842 | B1 * | 1/2002  | Fernandez et al. ............ | 725/133 |
| 6,539,545 | B1 * | 3/2003  | Dureau et al. ................. | 725/48 |
| 6,606,746 | B1   | 8/2003  | Zdepski et al. | |
| 7,558,221 | B2 * | 7/2009  | Nelson et al. ................. | 370/260 |
| 7,779,445 | B2   | 8/2010  | Ellis | |
| 7,917,937 | B1 * | 3/2011  | Fernandez et al. ............ | 725/133 |
| 7,982,762 | B2 * | 7/2011  | Chatting et al. ........... | 348/14.07 |
| 8,082,564 | B2 * | 12/2011 | Wang et al. ..................... | 725/32 |
| 8,613,034 | B1 * | 12/2013 | Harvey et al. ................. | 725/135 |
| 2002/0059610 | A1 | 5/2002 | Ellis | |
| 2003/0005432 | A1 | 1/2003 | Ellis | |
| 2005/0262542 | A1 * | 11/2005 | DeWeese et al. ............. | 725/106 |
| 2011/0122220 | A1 * | 5/2011 | Roberts et al. ............. | 348/14.04 |
| 2014/0063177 | A1 * | 3/2014 | Tian et al. .................. | 348/14.07 |

\* cited by examiner

*Primary Examiner* — James R Sheleheda
(74) *Attorney, Agent, or Firm* — Francisco A. Rubio-Campos; The Eclipse Group, LLP

(57) ABSTRACT

An interactive video system is provided that is capable of combining streaming televised events with video conferencing technology to create a social television experience. A first user is able to connect via a webcam and microphone to a server that combines the webcam video and sound from the microphone with a streaming video that could be a televised event. The combined webcam video, microphone sound, and streaming video is then broadcast to the first user and other users such that the users are capable of viewing the streaming video with the live conferencing video and sound from the first user. This procedure may be repeated such that a plurality of users may video conference live on top of the streaming video.

25 Claims, 27 Drawing Sheets

INTERACTIVE VIDEO SYSTEM

RELATED APPLICATIONS

This application claims priority of U.S. Provisional Patent Application Ser. No. 61/267,403, filed on Dec. 7, 2009, titled INTERACTIVE VIDEO SYSTEM, which application is incorporated in its entirety by reference in this application.

BACKGROUND OF THE INVENTION

1. Field of the Invention

The present invention relates to an interactive video system, and in particular, an interactive video system capable of combining streaming televised events with video conferencing technology to create a social television experience.

2. Related Art

Televised sporting events are often viewed in groups as the social setting enhances viewers' enjoyment of the game. However, in some situations, viewers may not be able to view the televised sporting events with their preferred friends, family, and acquaintances. Individuals may be scattered around the country, world, or otherwise unavailable. Nonetheless, viewers often seek out similar social interactions while viewing the sporting events using a variety of social media and social networking technology. For example, viewers may communicate via instant message, email, text message, or over the phone when viewing a televised sporting event.

However, viewers may not find known social networking technologies to be an adequate replacement for the social setting that accompanies group viewings of broadcast events. Further, viewers may be limited to communicating with friends one at a time using one type of social networking technology at a time. Moreover, use of social networking technology may divide the attention of the viewers between the televised broadcast and the communication device. Thus, there exists a need for an interactive video system that enables remote viewers to communicate with each other while simultaneously observing a broadcast event.

SUMMARY

To address the above illustrated problems, an interactive video system is provided that includes a host adapted to receive a plurality of audio/visual (A/V) streams from a respective plurality of clients, where the host combines at least a portion of the plurality of A/V streams to produce a combined A/V stream and transmits the combined A/V stream. The host transmits the combined A/V stream to at least one of the plurality of clients for simultaneous presentation of the combined A/V stream with an event broadcast on a display device at least one of the plurality of clients.

In addition, a non-transitory computer-readable storage medium is provided with an executable program stored thereon for presenting an interactive video display. The program is adapted to instruct a processing device to perform the steps of transmitting an audio/visual stream to a host, receiving a combined audio/visual (A/V) stream from the host where the combined A/V stream comprises at least a portion of at least one individual A/V stream received at the host, and presenting each individual A/V stream of the combined A/V stream in a respective conferencing window simultaneous with an event broadcast on a display device.

A method presenting an interactive video display is also provided. The method includes the steps of receiving a plurality of audio/visual (A/V) streams at a host from a plurality of clients coupled to the host, combining at least a portion of the plurality of A/V streams to produce a combined A/V stream, and transmitting the combined A/V stream to at least one of the plurality of clients for simultaneous presentation of the combined A/V stream with an event broadcast on a display device at the at least one plurality of clients.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

FIGS. 1-25 illustrate various implementations of an interactive video system of the present invention. The system combines streaming televised events with video conferencing technology to create a social television experience. The system provides this capability by enabling a first user to connect via a webcam and microphone to a server that combines the webcam video and sound from the microphone with a streaming video that may be a televised event. The combined webcam video, microphone sound, and streaming video may then be broadcast to the first user and other users such that the users are capable of viewing the streaming video with the live conferencing video and sound from the first user. This procedure may be repeated such that a plurality of users may video conference live on top of the streaming video.

Video System

Figure 1:
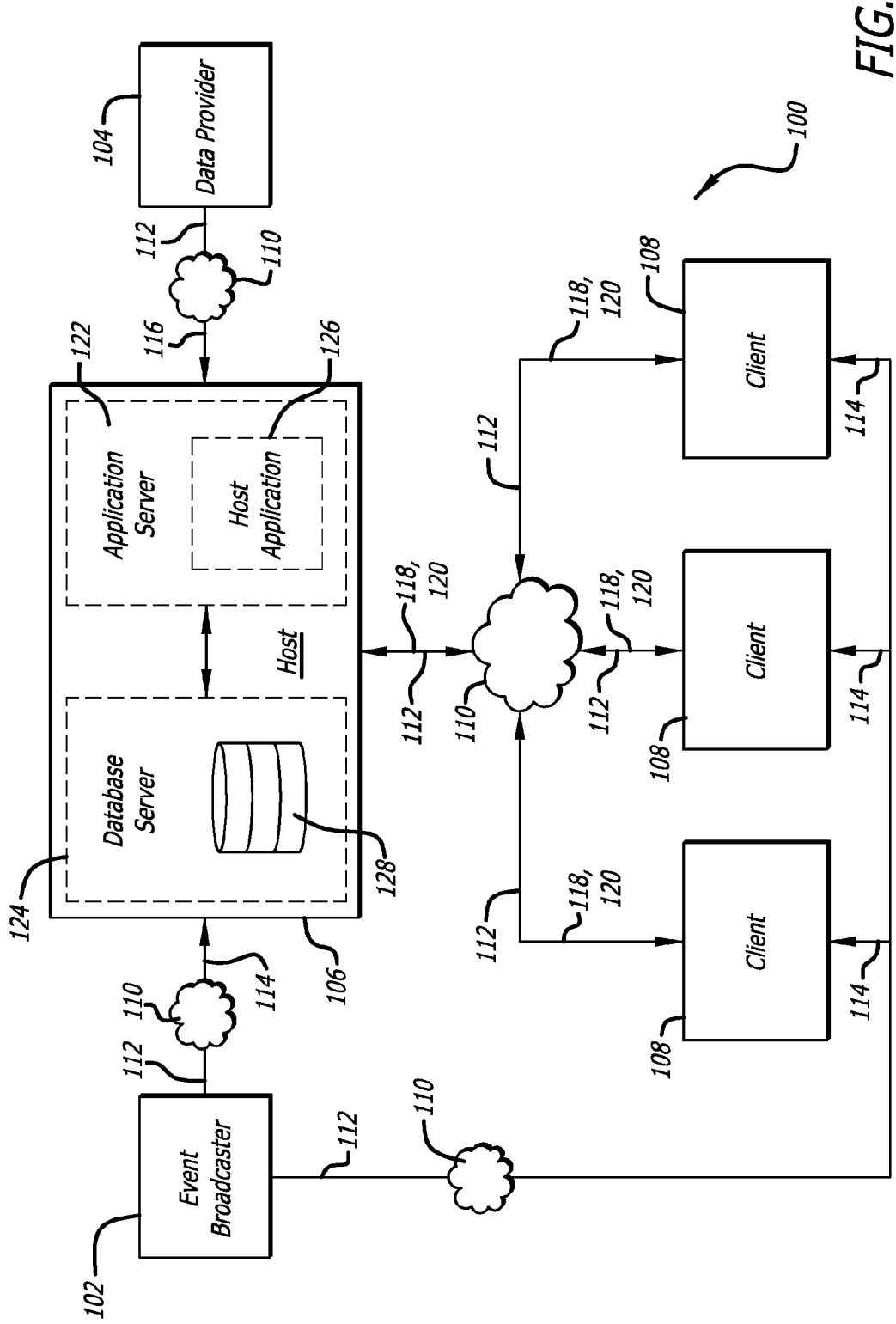
FIG. 1 is a schematic block diagram of an example of an interactive video system in accordance with an implementation of the present invention.

Referring to FIG. 1, an example of one implementation of an interactive video system 100 of the present invention is shown. The interactive television system 100, in the example shown, includes an event broadcaster 102, a data provider 104, a host 106, and one or more clients 108. The event broadcaster 102 is in communication with the clients 108 and the host 106 across a network 110 via a communication path 112. Similarly, the data provider 104 is in communication with the host 106 across a network 110 via a communication path 112. As seen in FIG. 1, the clients 108 are remote from the host 106 and also in communication with the host across a network 110 via a communication path 112. The event broadcaster 104 transmits a broadcast event 114 to the host 106 and to the clients 108. Similarly, the data provider 104 provides a data feed 116 to the host 106. Further, the host 106 and the clients 108 exchange communications 118 and audio/visual content (A/V content) 120.

As used herein the term "A/V content" refers to audio/visual content of a signal. The signal may originate from the event broadcaster 102, the host 106, or the clients 108 as described in further detail below. Further, the signal containing the A/V content may be "streamed" as an A/V signal stream. "Streaming" refers to content that is presented to an end user as the content is delivered to and received by the end-user. As used herein, the terms "A/V signal stream," "signal stream," and "A/V stream" refer to A/V content that is constantly received by an end-user and presented to the end-user while the A/V content is delivered to the end-user.

The networks 110 may include, for example, a broadcast television network, a cable television network, the Internet, a cellular network, or any other suitable wired or wireless telecommunications network. The communication paths 112 may include, for example, a satellite path, a radio transmission path, a fiber-optic path, a cable path, or any other suitable wired or wireless communication paths or combination of such paths. Accordingly, the broadcast event 114 may be transmitted as a terrestrial signal (i.e., "terrestrial television" or "over-the-air television"), as a wired signal using, for example, fiber-optic or coaxial cables (i.e., "cable television"), via communication satellites (i.e., "satellite television"), via an IP-based network such as, for example, the Internet (i.e., "Internet protocol television" or "IPTV"), or any other suitable broadcast medium capable of transmitting a broadcast event that includes audio/video content.

The event broadcaster 102 may transmit the broadcast event 114 as a signal (or stream) containing A/V content across the network 110 via the communication path 112 to the host 106, to the client 108, or to both the host and the client. The broadcast event 114 may be, for example, a television broadcast or an audio broadcast. One type of television broadcast includes a live, real-time televised broadcast of a sporting event. Other types of broadcast events include, but are not limited to, concert broadcasts, broadcasts of popular television shows, pay-per-view events, and the like. The event broadcaster 102 may be, for example, a television distribution facility, a music distribution studio, or any other suitable sources of television and/or audio broadcasts.

The data provider 104 may also be in communication with the host 106 to provide data feed 116 to the host. The data feed 116 may be transmitted from the data provider 104 to the host 106 across a network 110 such as the Internet ("web feed"). A web feed format that may be used to transmit the data feed 116 from the data provider 104 to the host 106 includes Really Simple Syndication (RSS). Data included in the RSS data feed 116 may relate to news updates, sports updates, or statistics relating to a "fantasy" sports game (e.g., "fantasy football").

The host 106 includes an application server 122 and a database server 124. The application server 122 includes one or more host software applications 126 to manage communications 118 and A/V content 120 exchanged between the host 106 and the clients 108. The host software application 126 facilitates the interactive aspects of the interactive television system 100 as discussed in further detail below. The database server 124 includes one or more databases 128 for storing information relating to the clients 108 and relating to the communications 118 and A/V content 120 exchanged between the host 106 and the clients 108 as also discussed in further detail below.

Figure 2:
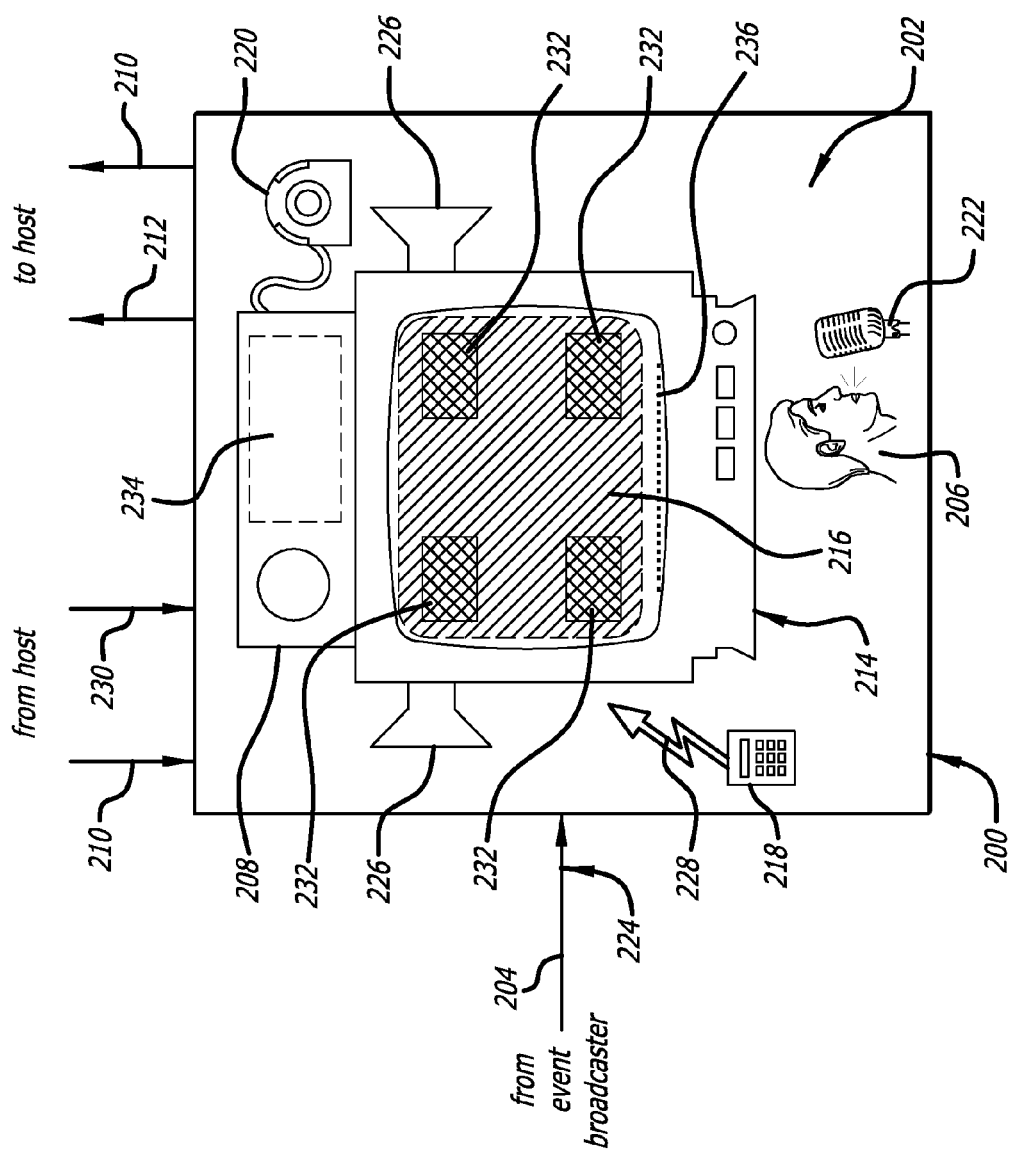
FIG. 2 is a schematic block diagram illustrative of client equipment of the interactive video system of FIG. 1.

Referring now to FIG. 2, an example client 200 of the interactive television system 100 is shown. The client 200 includes a display unit 202 for receiving a broadcast event 204 and displaying the broadcast event to a user 206 at the client 200. The display unit 202 may include: a communication device 208 for receiving the broadcast event 204 and for exchanging communications 210 and A/V content 212 with a host 106 (FIG. 1); a display device 214 for presenting to the user the A/V content 216 of the broadcast event and the communications 210 and A/V content 212 received from the host; one or more input devices 218 for transmitting user input to the communication device 208; and various A/V input devices 220, 222 for capturing A/V content from the user 206.

The display device 214 and/or the communication device 208 may be in communication with the event broadcaster 102 (FIG. 1) via a communication path 224. Accordingly, the display device 214 and/or communication device 208 may be adapted to receive the broadcast event 204 from the event broadcaster 102 via the communication path 224. The communication device 208 is further coupled to the display device 214 that displays the A/V content 216 of the broadcast event 204 to the user. The communication device 208 is further coupled to the host 106 and thus adapted to exchange communications 210 and A/V content 212 over a network 110 (FIG. 1) via a communication path 112 (FIG. 1).

The communication device 208 may be a computing device that includes a processing device, a storage device, input/output components, and other computing software and hardware. The processing device may be any form of microprocessor capable of executing the instructions or code. The storage device may be any form of data storage mechanism such as, a magnetic media, an optical disk, RAM, a flash memory, an EEPROM, and the like. The input/output components may include a network interface controller for transmitting or receiving communications across the network 110 and components for exchanging communications, data, and A/V signals with the display device 214 of the client 208.

The computing device 208 may be, for example, a console coupled to the display device 214 such as, for example, a cable-television set-top box, a satellite-television set-top box, a digital video recorder (DVR), a video game unit (e.g., a Playstation 3, an Xbox 360, or a Wii), or a personal computer. The display device 214 may be, for example, any type of television or computer monitor (e.g., a liquid crystal display, a cathode-ray tube display, an electroluminescent display, a heads-up display, a plasma display panel, or a vacuum fluorescent display), or any other suitable display device adapted to display a broadcast signal such as a television broadcast. The communication device 208 may also be incorporated in the display device 214 such as, for example, in an "Internet-ready" television.

The display unit 202 may also include various A/V input devices 220, 222 coupled to the console 208 and/or display device 214. The A/V input devices 220, 222 may receive A/V input from the user 206 at the client 200 and transmit the A/V content to the console 208. The console 208 may then transmit the A/V content captured from the user 206 to the host 102 coupled to the client 200. In the example shown, the A/V input devices include a video input device 220 (e.g., a camera or a "webcam") coupled to the console 208 and an audio input device 222 (e.g., a microphone) coupled to the console. The video and audio input devices 220, 222 may be any device or combination of devices capable of generating audio and video signals representative of the user and transmitting the audio/video signals to the console 208 or across a network 110. An audio output device 226 such as, for example, a speaker may also be coupled to the console 208 and/or display device 214 for presenting to the user the audio content of the broadcast event 204 and the audio content 212 received from the host 106.

The display unit 202 may further include an input device 218 for receiving user input 228 and transmitting the user input to the console 208. Input devices may include, for example, a keyboard and a computer mouse. In the example shown, the input device 208 is a television remote control that transmits user input 228 to the console 208 via infrared technology.

The components of the interactive video system 100 (FIG. 1) may be employed to provide users 206 with an interactive experience while observing a broadcast event 204. For example, the client 200 may receive a signal comprising A/V content 216 of a broadcast event 214 relating to a televised sports event such as a football game. The client 200 may receive the broadcast event 204 directly from the event broadcaster 102 or from the host 106, which may also receive the broadcast event 114 (FIG. 1) from the event broadcaster. While the user 206 is observing the broadcast event 204, the user may capture audio and video content via the camera 220 and the microphone 222. The console 208 may then transmit the captured A/V content 212 to the host 106. The host 106 may then combine A/V content 212 from multiple users into a combined A/V signal 230.

The host 106 may subsequently transmit the combined A/V signal 230 back to each client 200 for simultaneous display with the broadcast event 204 on the display device 214. The combined A/V signal 230 may incorporate the A/V signals from multiple clients 200 such that an A/V signal 212 from a client 200 is overlaid on top of the A/V content 216 of the broadcast event 204 as a smaller "conference" window 232. Thus, the users 206 at each client 200 may interact and communicate with each other via the conference windows 232 while observing the broadcast event 204.

A client software application 234 (i.e., "executable program") may reside in a storage module (not shown) of the console 208 for managing input 228 from the user and the A/V content received from the A/V devices 220, 222. The client software application 234 may also manage the display of the broadcast event A/V content 216, the combined A/V signal 230 received from the host 106, and the web feed data 236 received from the host. The web feed data 236 may be displayed across the bottom of the display device 214 as, for example, a scrolling news ticker. Alternatively, the web feed data may be displayed in columns on either side of the broadcast event A/V content 216. Other presentations for the web feed data 236 may be selectively employed. Additionally, the client software application 234 exchanges communications 210 with the host software applications 126 (FIG. 1) to facilitate the interactive aspects of the video display system 100 as discussed in further detail below.

Briefly referring back to FIG. 1, both the host 106 and the client 108 may receive the broadcast event 114 from the event broadcaster 102. In a first example implementation, the host 106 may receive the broadcast event 114, combine the A/V content of the broadcast event with the A/V content of the signals 120 received at the host from the clients, and transmit the combined A/V signal 230 (FIG. 2) to the clients. Alternatively, in a second example implementation, the host 106 may receive the broadcast event 114 and relay or rebroadcast the broadcast event 114 to the clients 108 instead of combing the A/V content of the signals 120 received at the host from the clients 108. In a third example implementation, the clients 108 may directly receive the broadcast event 114 from the event broadcaster 102 rather than receiving the broadcast event 114 from the host 106 as a rebroadcasted signal or as part of the combined A/V signal 230.

As mentioned above in reference to FIG. 1, the host 106 may include a database server 124 on which resides a database 128 for storing information relating to the clients 108 and relating to the communications 118 and A/V content 120 exchanged between the host and the clients. One or more databases 128 may be configured to store user information. The databases 128 may store information relating to user accounts, user profiles, user access credentials, user contact information, user demographic information, and user preferences relating to preferred types of broadcasts (e.g., sports broadcasts, music broadcasts, etc.). As an example, a user may prefer to use the interactive video system 100 to watch sports broadcasts with friends also using the interactive video system. In this example, the database 128 may store the preferred sport of the user and the preferred team of the user.

Additionally, and as discussed further below, the client software application 234 (FIG. 2) may allow a user to associate and link to other users (i.e., "add a friend") in order to generate a list of friends (i.e., a "friend list"). The database 128 may store the friend lists of the system users. Also discussed further below, the client software application 234 may allow users to create groups of friends with which the user prefers to watch particular types of broadcasts. The database 128 may store information relating to the user-created groups of friends associated with a user profile. Additionally, the database 128 may store email communications from a client 108 coupled to the host 106 such as, for example, email communications exchanged between clients coupled to the host. The database 128 may also store metrics relating to clients 108 and the viewing habits of clients. For example, the database 128 may store a list of the event broadcasts 114 viewed by a client 108; how long the client views an event broadcast; and the duration of use of the interactive video system 100 when viewing an event broadcast. Those skilled in the art will recognize that additional or alternative information may be selectively stored in the database 128 of the interactive video system 100.

The database 128 may also store information relating to web feeds 116 subscribed to by a user. As discussed further below, a web feed 116 may be an RSS feed. The RSS feed 116 may be, for example, statistics and information relating to a "fantasy" sports team managed by a user at a client 108. The fantasy sports team may be provided by a third-party service provider 104 such as Yahoo or ESPN for example. As part of the service, the third-party service provider 104 may offer an RSS feed 116 that includes player performance statistics, news, and updates related to the fantasy sports team. Accordingly, the interactive video system 100 may allow a user to store the access credentials for the fantasy sports team account in the database 128. In turn, the host application 126 may use those access credentials to access the RSS feed 116 of the fantasy sports account of the user. The host application may then combine the data delivered by the RSS feed 116 in the combined A/V signal 230 (FIG. 2) for display at the display device 214 (FIG. 2) simultaneous with the event broadcast.

The databases 128 may be controlled and maintained by a database management system (DBMS), and, in particular, by a relational database management system (RDBMS) or an object database management system (ODBMS). Further, the database may be accessed by the DBMS using any suitable database query language such as, for example, SQL, MySQL, or Oracle.

Client and Host Applications

As set forth above in reference to FIG. 2, a client software application 234 residing on a console 208 at the client 200 may communicate with a host software application 126 (FIG. 1) residing on an application server 122 at the host 106 of the interactive video system 100. The communications 210 between the client 200 and host software applications 126 facilitate the interaction between users of the interactive video system 100 during a broadcast event.

The client software application 234 may be installed on the console 208 coupled to the display device. Accordingly, the client software application 234 may be stored in a storage module (not shown) at the client and instruct a processing device (not shown) of the console to execute various tasks. The storage module may be any form of data storage mechanism accessible by the processing device or any combination of such forms, such as, a magnetic media, an optical disk, a random access memory (RAM), a flash memory, or an electrically erasable programmable read-only memory (EEPROM), and the like. The processing device may be any form of microprocessor capable of executing the instructions or code of the client software application 234.

The client software application 234 may be implemented on any suitable development platform using any suitable programming language known to those skilled in the art. For example, the client application may be developed using Adobe Systems' Flash platform as an Adobe AIR application using the ActionScript programming language. Additional or alternative programming languages and/or development platforms may be selectively employed for implementing the client software application.

Further, the client software application 234 may be compiled as an executable file for execution by the processing device of the console. As further explained below, the client software application 234 may be configured to perform the following tasks: connect to the host; register users; initiate a session with the host; configure operation of the client software application; display the broadcast content, the conferencing windows, and the data from the web feed; manipulate the arrangement, position, size, and volume of the conferencing windows; browse and display descriptions for available event broadcasts; manage the user profile, friend list, and groups of a user; manage "chat room" sessions between the client and other clients coupled to the host; and invite friends to interactively observe a broadcast event via the conferencing windows.

To perform the tasks listed above, the client application 234 (FIG. 2) may include the following modules or subcomponents: a registration module for registering a new client with the host; an access module for requesting access to the host; a session manager for managing an active session between the client and the host; a configuration manager for configuring the client software application according to the preferences of the user; an audio decoder and a video decoder for decoding A/V content received from the host; a multimedia player for presenting the decoded A/V content to a user at the client; a communication and/or manager for managing emails, chat messages, and the like exchanged between the client and other clients; and a user interface manager for presenting the user interface to the user at the client and responding to user input at the user interface. The video decoder and multimedia player may be adapted to decode and present A/V content encoded in the FLV format (Flash Video format), which may be available from Adobe Systems Incorporated.

Figure 3:
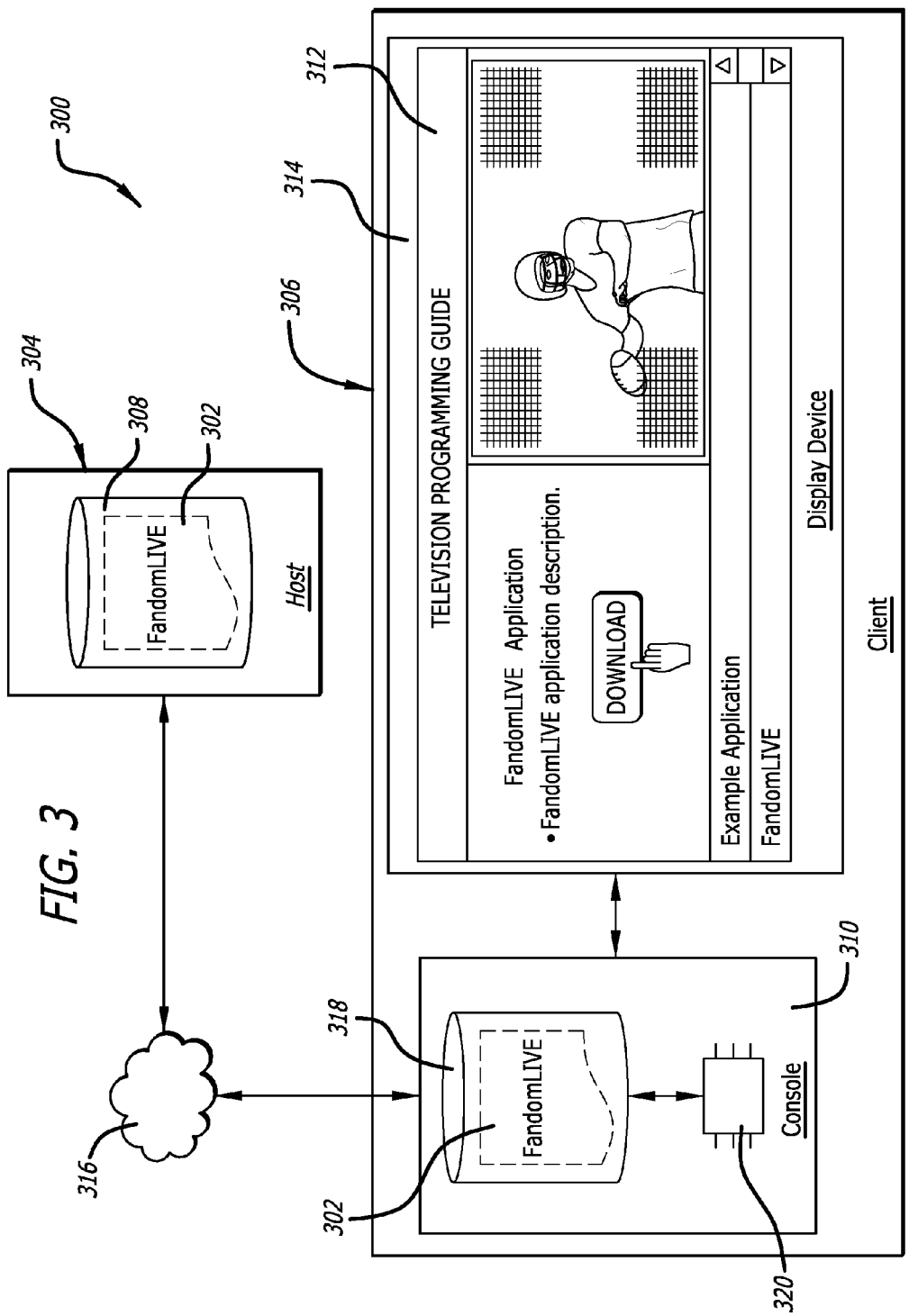
FIG. 3 a schematic block diagram illustrative of one example of an implementation of system for transmitting the client software application to an end-user client in accordance with the present invention.

Referring now to FIG. 3, an example system 300 for transmitting the client software application 302 to an end-user client is shown. The system 300 includes a server 304 and client 306. The client software application 302 may be stored in a storage module 308 of the server 304 remote from the client. A console 310 at the client 306 may present a user interface 312 at a display device 314 of the client. The user interface 312 may be used to select the client software application 302 and request the client software application from the server 304. The client 306 may then transmit a request to the server 302 across a network 316. The server 304 may receive the request from the client 306 and transmit the client software application 302 over the network 316 to the client for storage in a storage module 318 at the console 308 and subsequent execution by a processing device 320. Similar to the storage modules mentioned above the storage modules 308, 318 of the server 304 and console 310 may be any form of data storage mechanism such as, a magnetic media, an optical disk, RAM, a flash memory, an EEPROM, and the like.

As an example, the server 304 may be deployed at a television provider such as a cable television or satellite television provider. The client software application 302 (e.g., "FandomLIVE") may be stored in a storage module 308 at the server 304 of the television provider. The display device 314 at the client 306 may be a television, and the console 310 may be a cable television or satellite television receiver for receiving a television broadcast from the television provider. The television receiver 310 may present a programming guide 312 on the television 314. A user may use a remote control 218 (FIG. 2) to navigate the programming guide 314 and select the client software application 302 for retrieval from the server 304 of the television provider. In response to receipt of the request from the client 306, the server 304 may transmit the "FandomLIVE" application 302 to the client where the application may be stored in a storage module 318 of the television receiver 310. Those skilled in the art will recognize that the client software application or executable file may be any suitable non-transitory computer readable storage medium.

Referring again to FIG. 1, the host software application 126 may similarly be implemented on any suitable development platform using any suitable programming language known to those skilled in the art. For example, the host software application 126 may be implemented using Adobe Flash Media Server, which may be available from Adobe Systems Incorporated. The host application may also be implemented using the Real Time Messaging Protocol (RTMP) for streaming audio, video, and data content over a network such as the Internet. The RTMP may be available from Adobe Systems Incorporated. The host application may be developed using the ActionScript programming language. Alternatively, the server may be implemented on the Wowza platform as a Wowza media server. Additional or alternative programming languages and/or development platforms may be selectively employed for implementing the host software application. The host software application 126 may be one application installed on a single application server 122 or multiple applications installed across multiple application servers in communication with each other.

The host software application 126 may be configured to perform the following tasks: manage the exchange of information stored and retrieved from the database; register clients 108, authenticate clients, initiate and manage client sessions; manage client chat sessions; receive the A/V signals 120 from the clients; receive and buffer the signal for the broadcast event 114; rebroadcast the signal for the broadcast event to the clients; combine the A/V signals of the broadcast and event and the A/V signals from the client to produce a combined A/V signal 230 (FIG. 2); encode the combined A/V signal and/or the signal for the event broadcast; transmit the combined A/V signal to appropriate clients; retrieve web feed data 116 and combine the web feed data with the combined A/V signal; and randomly assign clients for interactive conferencing during a broadcast event.

To perform the tasks listed above, the host software application 126 may include the following modules or subcomponents: a registration module for processing new client registrations; an authentication module for authenticating clients 108 requesting access to the host 106; a session manager for initiating and maintaining sessions with clients coupled to the host; a client chat session manage for managing client "chat rooms;" an audio and video encoder for encoding the A/V content received at the host; and a communication manager for routing emails, chat messages, and other communications between clients coupled to the host. The video encode may encode the A/V signal for the broadcast event 144 and the A/V signals 120 received from the clients using a format compatible with the video decoder and multimedia player at the clients. A suitable video format may be, for example, the FLV format, which may be available from Adobe Systems Incorporated as mentioned above.

The host 106 may be configured to initiate a session with a client 108 for exchanging communications 118, receiving A/V content 120 from the clients, and for transmitting a combined A/V signal 230 to the client. As mentioned above, the client 108 may be configured to initiate a session with the host 106 and the host may be configured to authorize the client. If a client 108 has not yet registered for access to the host 106, the user at the client may transmit desired access credentials (e.g., a username and password) to the host. The host 106 may store the user access credentials in the database 128 and associate the access credentials with a profile for the client and user. Once a user has registered, the user may send a request for access from the client 108 to the host 106. The request may include the access credentials of the user. An authenticator (not shown) at the host 106 may verify the access credentials received from the client 108 with the credentials stored for the user in the database 128. If the credentials match, the host 106 initiates a session with the client 108 whereby the client may exchange communications 118 and A/V content 120 with the host.

Main Menu

Figure 4:
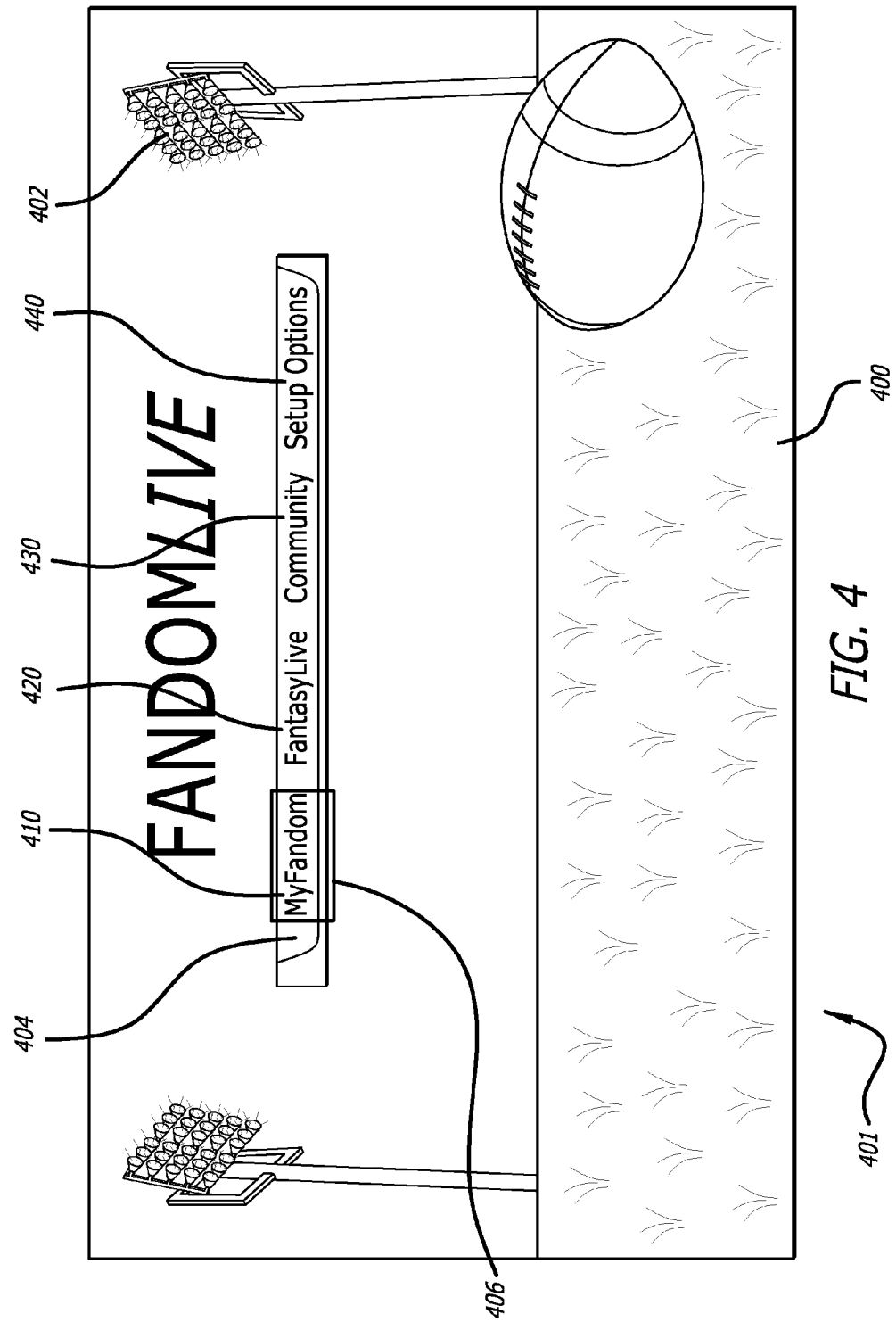
FIG. 4 illustrates one example of a main menu screen of the client application of FIG. 3.

FIG. 4 illustrates a display unit 401 displaying one example of an implementation of a main menu screen 400 of a client application of the present invention. The main menu screen 400 represented in FIG. 4 is an example of a menu screen for a television application for viewing terrestrial, cable, satellite, pay-per-view, or other television broadcast programming. The main menu screen 400 may display, for example, a product brand graphic 402 overlaid with a menu 404 of selectable application features 410, 420, 430, 440 positioned along the top of main menu screen 400. The features shown in FIG. 4 are merely illustrative, as any number of suitable features may be provided to the user if desired.

The user may indicate a desire to select application features from the main menu 404 by, for example, moving highlight region 406, or in other implementations a cursor or other selectable device, to highlight the desired feature and pressing an "OK" key on the remote control 218 (FIG. 2). According to this implementation of the invention, if the user selects feature 410, the MYFANDOM feature of the client application may be activated by the user. Feature 420 may be selected to activate the FANTASYLIVE feature of the client application. Feature 430 may be selected to activate the COMMUNITY feature of the client application. Feature 440 may be selected to activate the SETUP OPTIONS feature of the client application. The various modes and options of the selectable application features 410, 420, 430, 440 are described in further detail below.

Application Features

A. MyFandom Feature

As mentioned above, application feature 410 activates the MYFANDOM feature of the client application. The MYFANDOM feature enables the user to connect with and view personal, statistical, and other information about other network users. As used herein, the term "network user" refers to any client user (FIG. 1) in communication with network 110 (FIG. 1).

Figure 5:
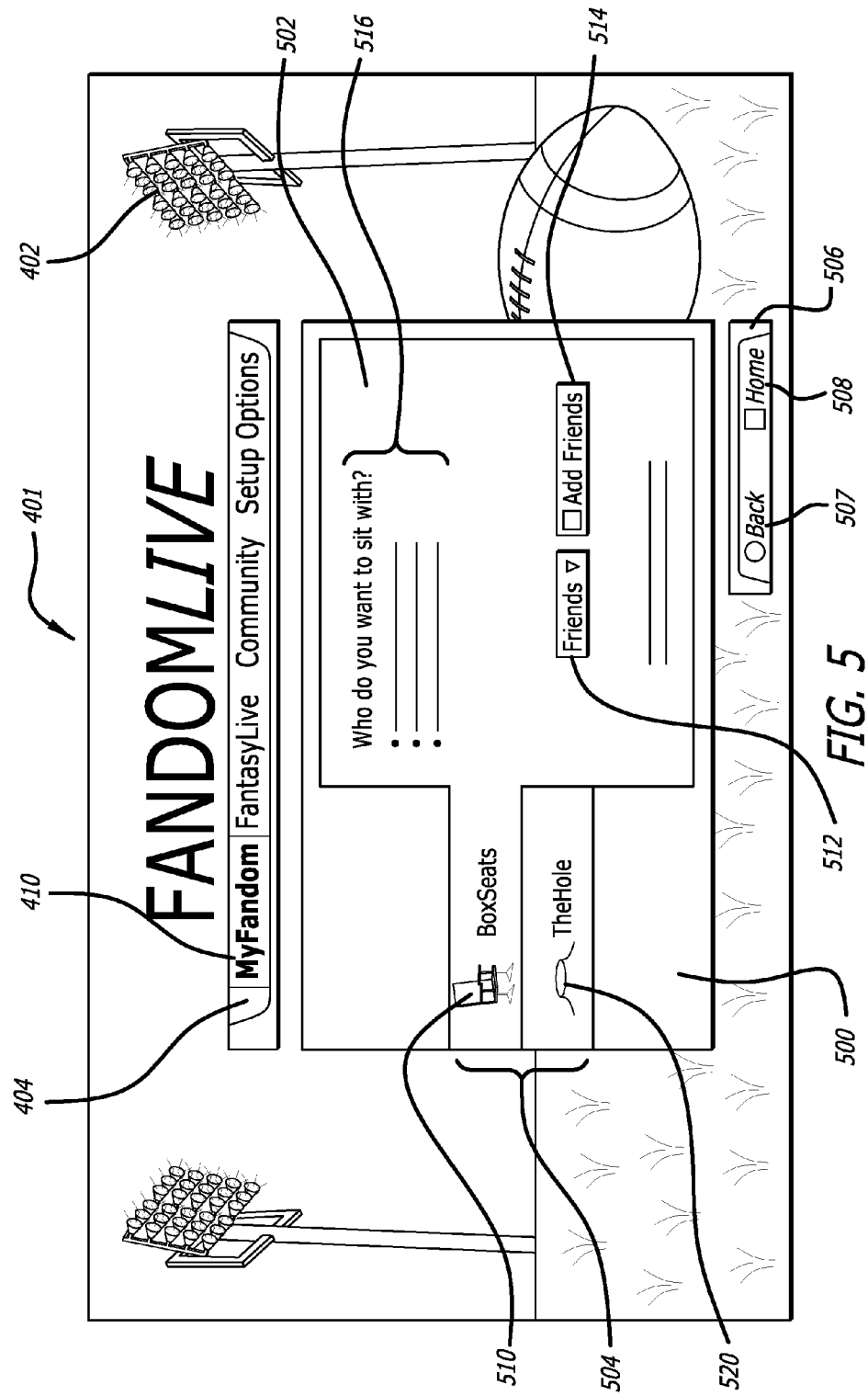
FIG. 5 illustrates one example of the MYFANDOM main menu screen of the client application of FIG. 3.

FIG. 5 illustrates one example of a MYFANDOM main menu window 500 that may be generated by the client application for display in response to the user's selection of the MYFANDOM application feature 410. The menu window 500 may include an option window 502 and a list of selectable mode features 504. The list of mode features 504 may include a "BoxSeats" mode feature 510 and a "TheHole" mode feature 520. The "BoxSeats" mode feature 510 appears as a default mode feature when the user activates the MYFANDOM application feature 410. The option window 502 may include option buttons 512 and 514 and a region 516 for displaying information about the available option features. In this example, the "BoxSeats" mode feature enables the user to, for example, view a friend's user profile, determine what users are logged onto the system network, send and receive instant messages from other network users, and request other network users to simultaneously watch a live event with them.

Figure 6:
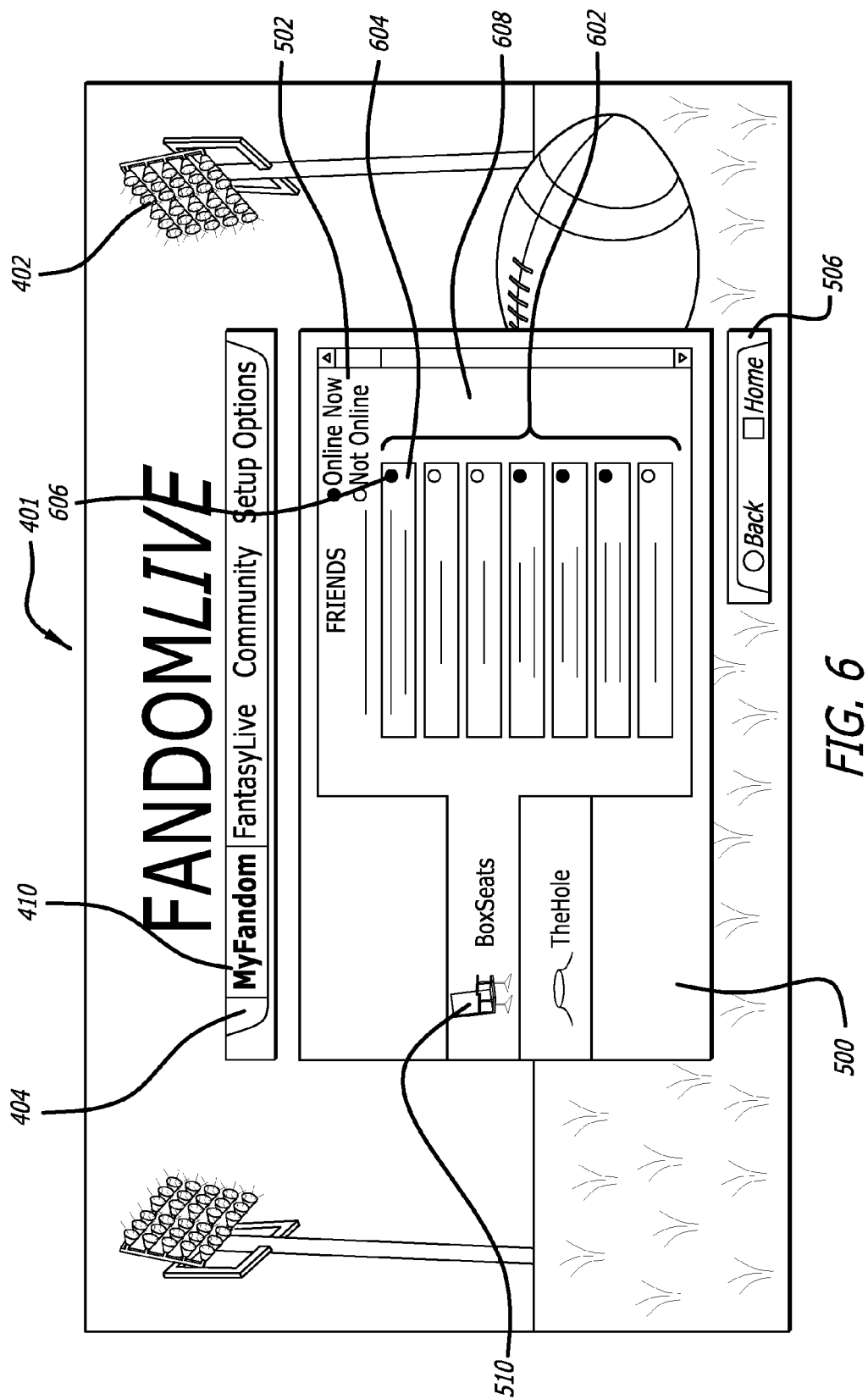
FIG. 6 illustrates one example of a display screen showing a friends listing in the BoxSeats mode of the client application of FIG. 3.

As illustrated, the option buttons may include a "Friends" option 512 and an "Add Friends" option 514. In response to a user's selection of the "Friends" option 512, the application may, for example, provide a listing of user friends 602 in the option window 502 that the user may invite to watch a broadcast event, as illustrated in FIG. 6. Each user friend may be identified by personal name or a username displayed on a button 604 that the user may select by highlighting or clicking the option button 604 with a remote controller, cursor, or other selectable device. Each button 604 may include a status indicator 606 to identify whether a network user is currently logged onto (i.e., is "online") or logged off of the network. A scroll bar 608 may appear along the right side of the option window 502 to enable the user to scroll through the complete listing of user friends.

In response to a user's selection of the "Add Friend" option 514, the application may, for example, provide a window that enables the user to manually input and save information regarding a network user onto the user's "friends" database, such as their username, personal name, or email address, for example. In other implementations, the system may, for example, provide a listing of network users who are registered with the network and the user may add them as user friends by selecting their user names from the listing, a request is sent to the network user asking them to join the user's "box seats" as a "friend." If the network user "accepts" the request, the application will save the network user's information to the system database 128 (FIG. 1), from which the network user's profile and other information may later be retrieved by the user via the "Friends" option 512. For purposes of this example, when a network user is added as a user friend, the network user is added, or joins the user's "box seats." If the network user "rejects" the request, then the user may be informed, for example, that the network users' box seats is full, the request has been rejected, or the user may receive a customized reply message created by the network user.

If desired, as shown in the figures herein, the main menu 404 may appear above each feature, option, and mode screen as the user navigates through the client application. This feature enables the user to instantly activate any of the application features 410, 420, 430, 440 regardless of the feature, mode, or option currently accessed by the user. In addition, as shown in FIG. 5, a navigation menu bar 506 may appear below each feature, option, and mode screen as the user navigates through the client application. As illustrated, the navigation menu 506 may include a "Back" option 507 to enable the user to return to a preceding feature, option, or mode screen, and a "Home" option 508 to enable the user to return to the main menu screen 400.

Figure 7:
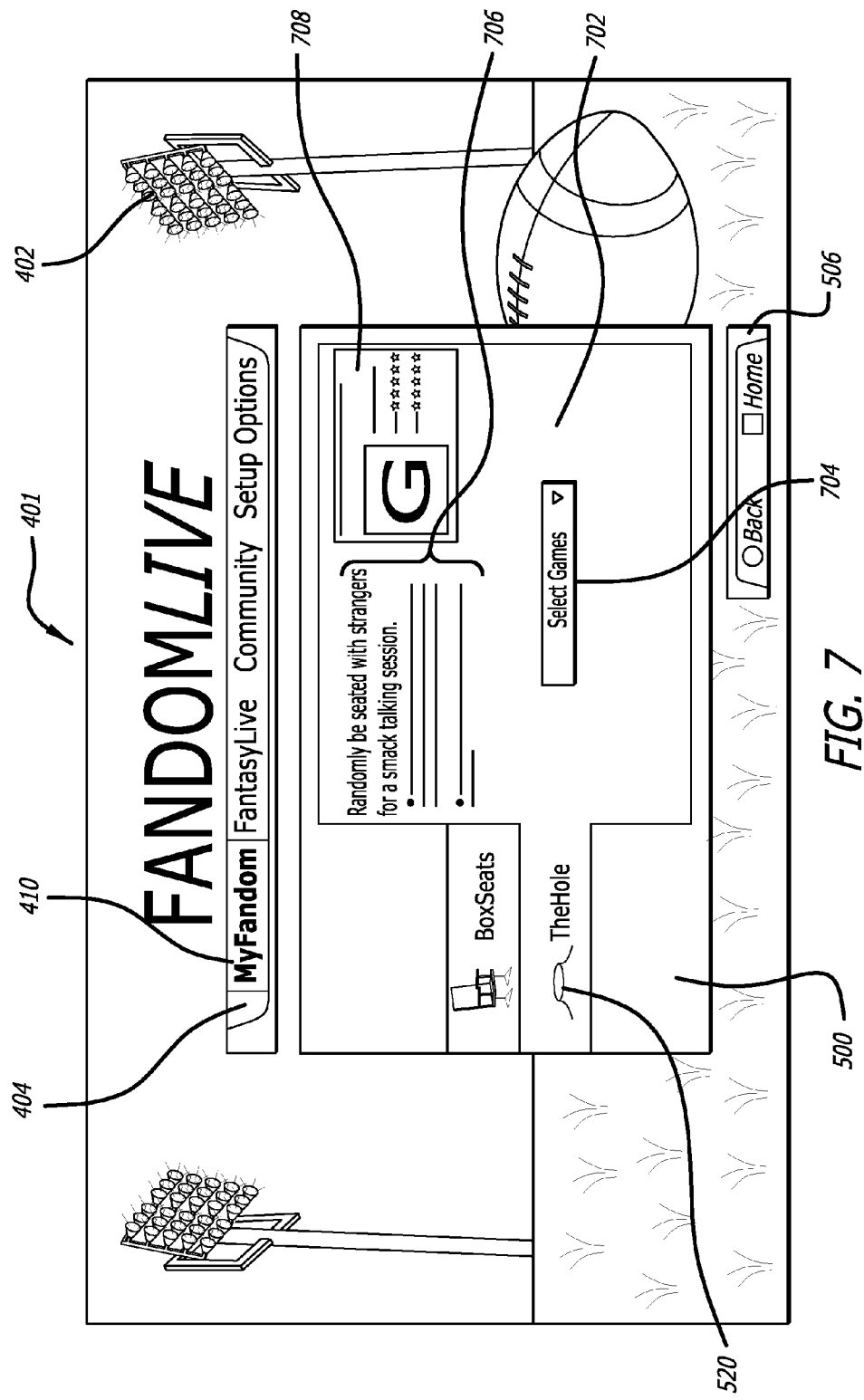
FIG. 7 illustrates one example of a menu screen of the TheHole mode of the client application of FIG. 3.

FIG. 7 illustrates one example of the MYFANDOM menu window 500 when the user selects the "TheHole" mode feature. In this mode, an option window 702 may appear that includes an option button 704, a region 706 for displaying information about the available option features, and a graphic 708 that provides information about other network users who have most recently watched lives events network simultaneously with the user. In the "TheHole" mode, the user may, for example, identify other network users who have who are presently, or who have in the past viewed a streaming live event simultaneous with the user. And in addition to identifying these other network users, the user may, for example, evaluate the network users based on criteria such as "Smack Talking" or "Knowledge" of the sports teams or event, for example. Based on the user's evaluation, a user rating may be applied to other network users, which may be displayed in the graphic 708.

Figure 8:
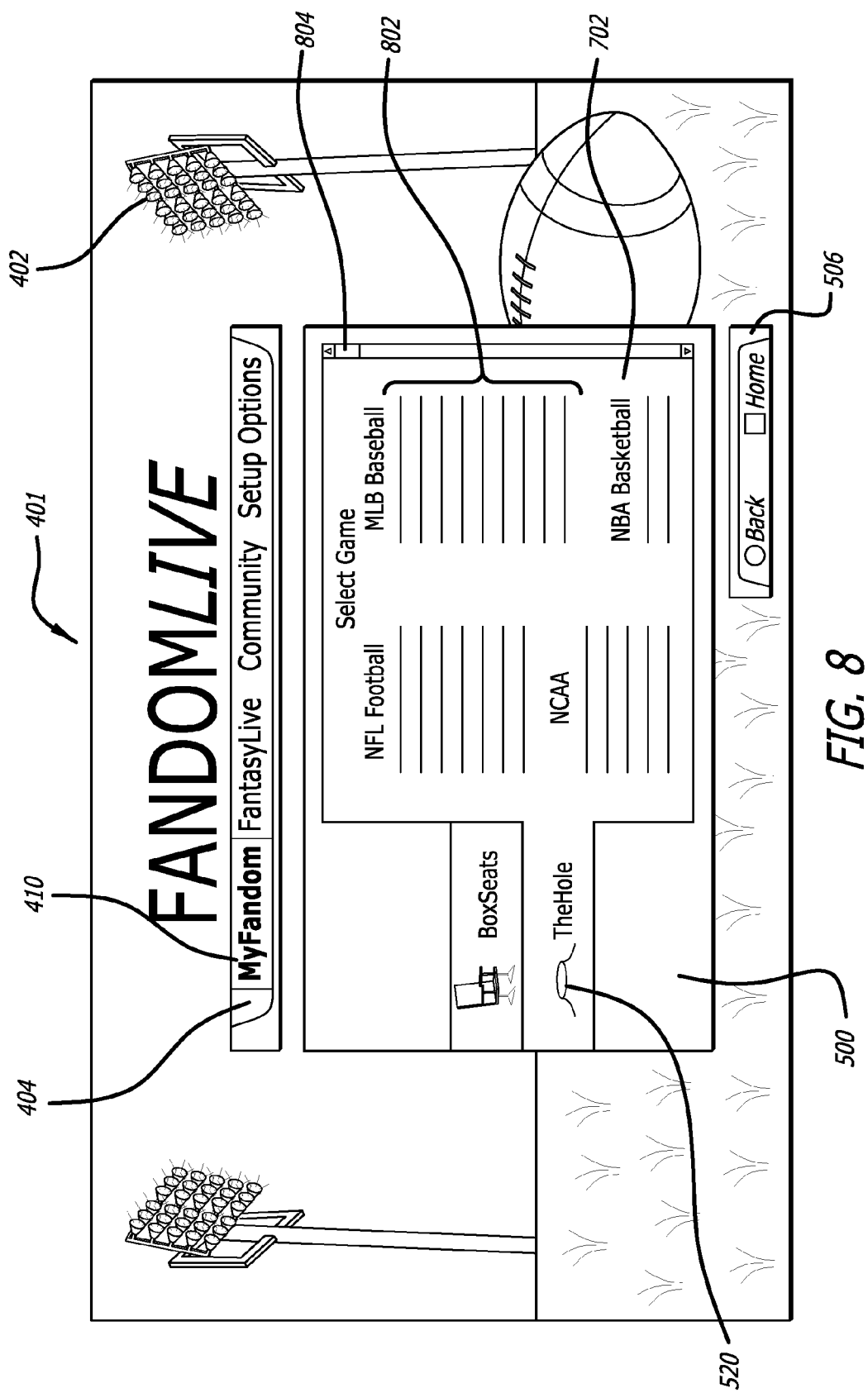
FIG. 8 illustrates one example of a display screen showing a "Select Game" feature of the TheHole mode of the client application of FIG. 3.

The option button 704 may include a "Select Game" option feature. In response to a user's selection of the "Select Game" option 512, the application may, for example, provide a listing of sporting events 802 in the option window 702 that the user may wish to view, as illustrated in FIG. 8. A scroll bar 804 may appear along the right side of the option window 702 to enable the user to scroll through the complete listing of events. The user may select an event by highlighting an event on the event listing 802 with a remote controller, cursor, or other selectable device. Once an event is selected by the user, the user may be directed to a system portal, for example, the FandomLive social video room or "box seats," where the user may invite other network users to join the user's virtual box seats. Once selected and added to the box seats, the network users and the user may then be directed to the FANTASYLIVE feature 420 by clicking or otherwise selecting a feature button provided to the user in a subsequent option window.

B. FantasyLive Feature

A second application feature of the client application of the present invention may include the FANTASYLIVE application feature 420. The FANTASYLIVE feature enables the user to interact with other network real-time while viewing a broadcast event.

Figure 9:
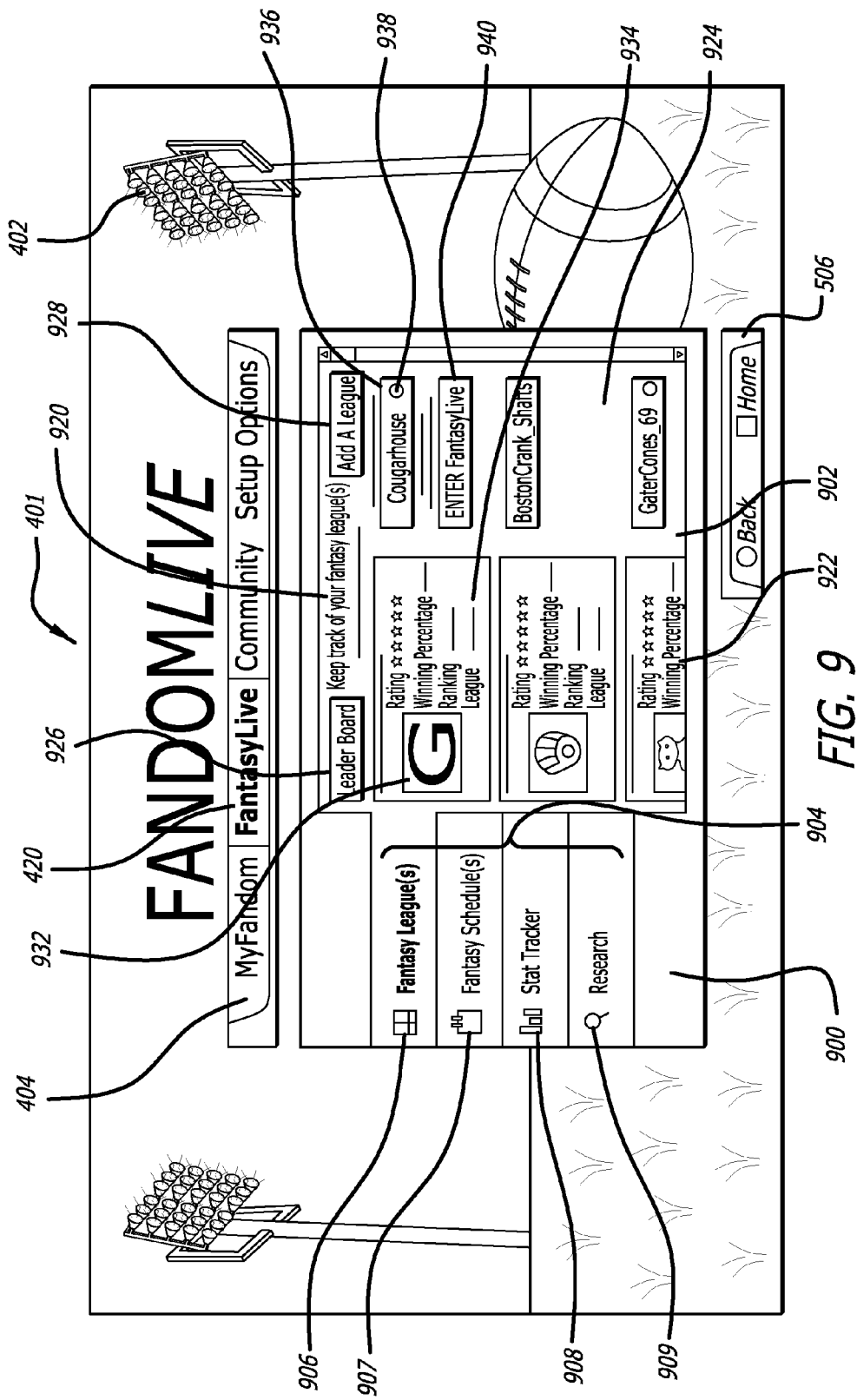
FIG. 9 illustrates one example of the FANTASYLIVE main menu screen of the client application of FIG. 3.

As illustrated in FIG. 9, when the user selects the FANTASYLIVE feature 420, the client application may provide a main menu window 900 that includes an option window 902 and a list of selectable mode features 904. The list of selectable mode features 904 may include, for example, a "Fantasy League(s)" mode feature 906, a "Fantasy Schedule(s)" mode feature 907, a "Stat Tracker" mode feature 908, and a "Research" mode feature 909. When the user selects the FANTASYLIVE application feature 420, the "Fantasy League(s)" mode feature 906 appears as the default mode feature.

In the "Fantasy League(s)" mode feature 906, as shown, the option window 902 may include a leader 920, one or more graphics 922, and a region 924 for displaying a listing of other network users comprising, for example, a fantasy sports league.

Figure 10:
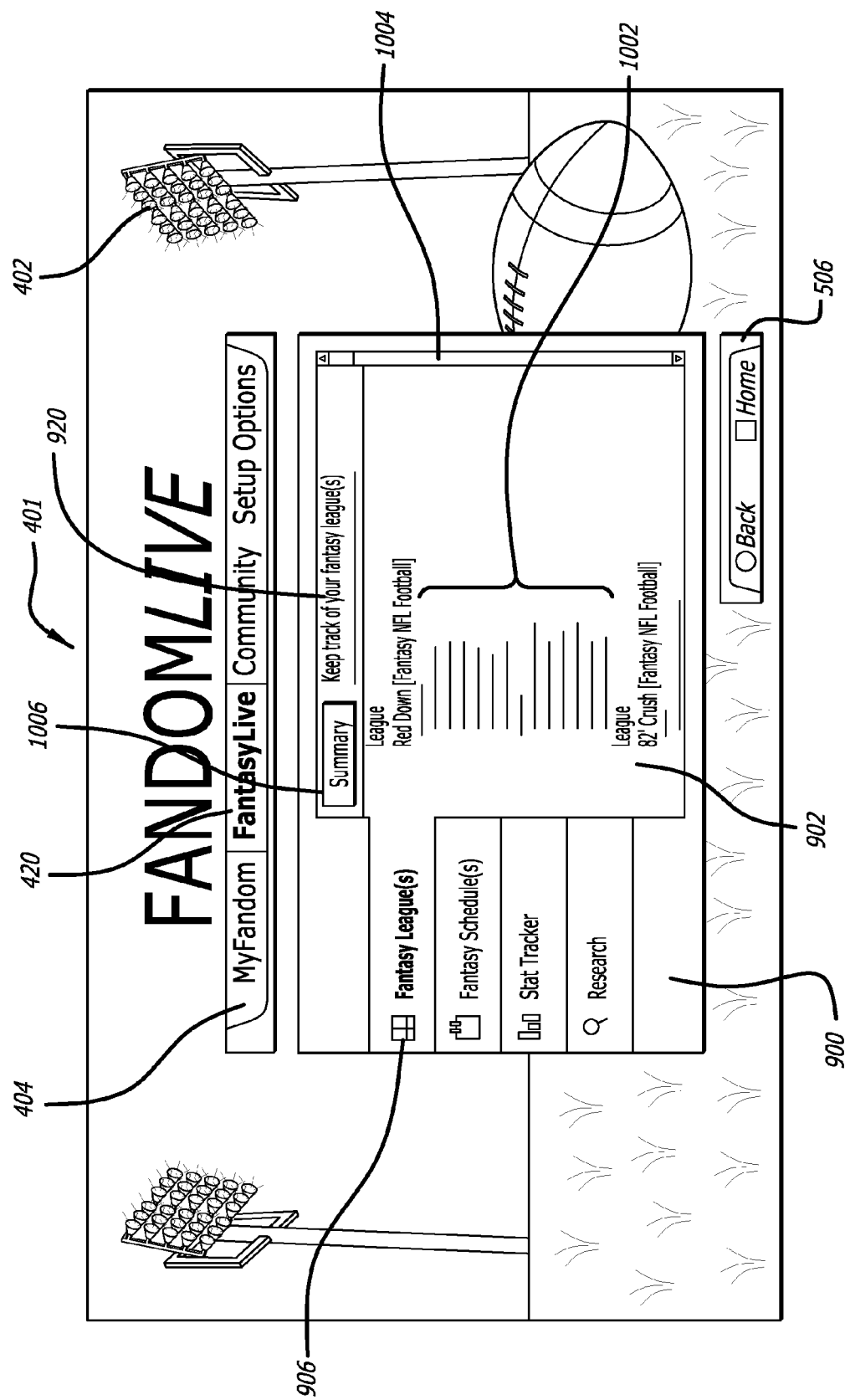
FIG. 10 illustrates one example of a display screen showing a fantasy sports league listing in the Fantasy League(s) mode of the client application of FIG. 3.

The leader 920 may include option buttons 926 and 928 and a region 930 for displaying information about, for example, the status of the user's fantasy teams and leagues. As illustrated, the option buttons may include a "Leaderboard" option 926 and an "Add A League" option 928. If the user selects the "Leaderboard" option 926, the application, for example, links via RSS feed to each fantasy sports league site to which the user has saved, for example in the user profile, username and login information, and displays a listing 1002 of user's respective fantasy leagues in the option window 902, as illustrated in FIG. 10. The user may access statistical and other information concerning one of the listed fantasy leagues by clicking or otherwise selecting the displayed name or title of the fantasy league. A scroll bar 1004 may appear along the right side of the option window 902 to enable the user to scroll through the complete listing of fantasy league statistics. In this option, the leader 920 may include a "Summary" option button 1006. If the user selects the "Summary" option 1006, the user will return to the "Fantasy League(s)" mode main feature screen 900.

Returning back to the "Fantasy League(s)" mode main menu screen 900 illustrated in FIG. 9, if the user selects the "Add A League" option 928, a listing of, for example, fantasy sports leagues in communication with the network may be displayed in the option window 902. The user may then select from the fantasy sports league listing by highlighting or clicking the particular fantasy sports league the user would like to join. Once a fantasy sports league is selected, the user's account information, for example username and password, may be entered and stored in a user data file on the system database 128 and the added sports fantasy league may then appear in the fantasy sports league listing.

As illustrated, the "Fantasy League(s)" option window 902 may include one or more graphics 922. Each graphic 922 represents, for example, an opposing fantasy player, which may be listed according to statistical ranking. Each graphic 922 may display, for example, a team logo or image 932 and user information 934 such as, for example, user ratings, winning percentage, user rankings, and the fantasy league to which the user belongs.

Region 924 may, for example, display a listing of the users past, present, and future fantasy league opponents. Each opponent may be identified by a selectable banner 936 displaying the network user's registered username. The banner may include a status indicator 938 to identify whether a network user is currently logged onto or logged off of the network.

When a particular sporting event of interest is currently airing, a selectable "Enter FantasyLive" option button 940 may be displayed below the fantasy league opponent's user banner 936. The "Enter FantasyLive" option button 904 activates the FantasyLive interactive video feature, which may allow the user to watch a live televised sporting event, while interacting via video conferencing with other selected network users, for example in this instance, a fantasy league opponent.

Figure 11A:
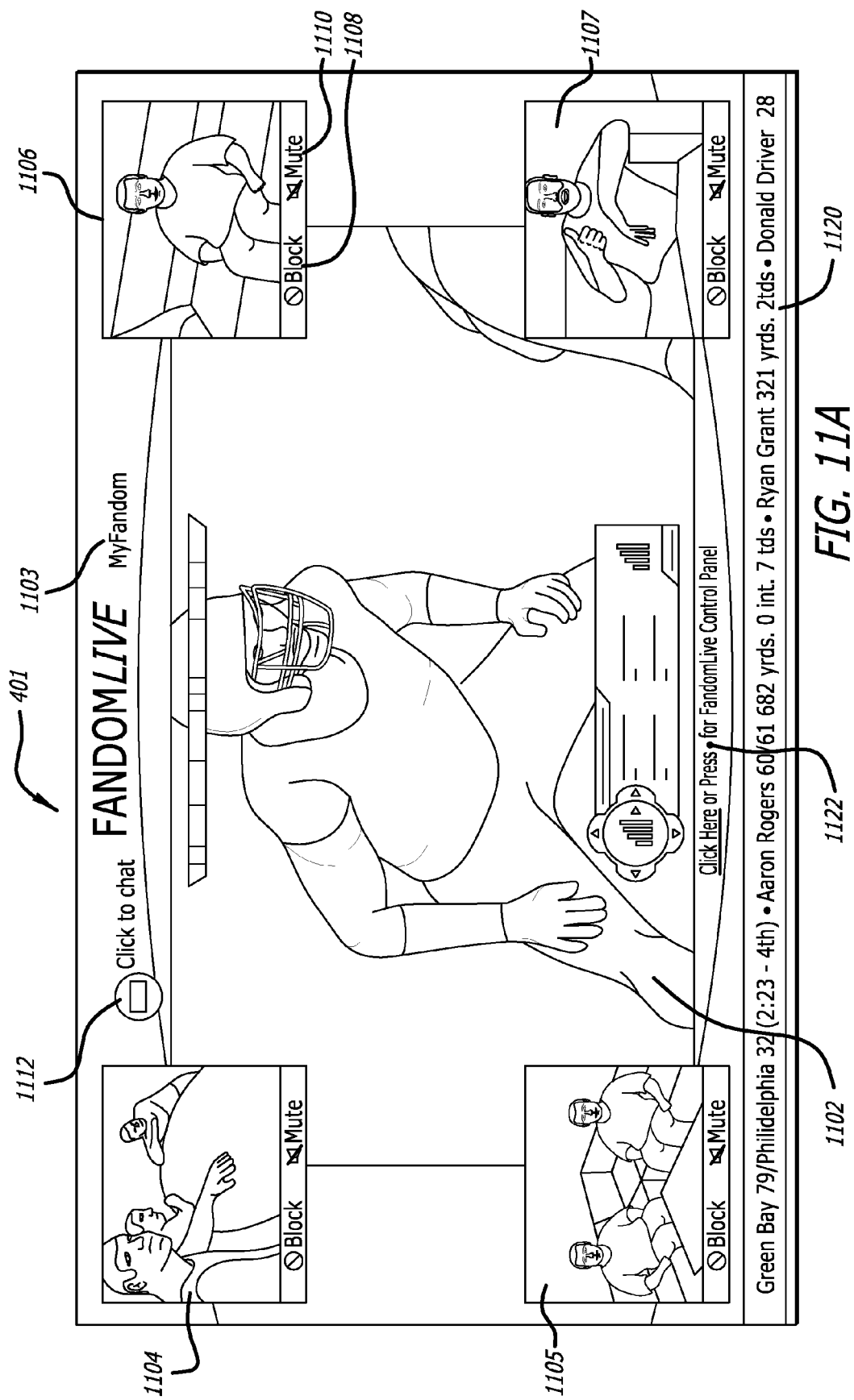
FIG. 11A illustrates one example of a display screen showing a main video window with a plurality of picture-in-picture user display windows in the FantasyLive feature of the client application of FIG. 3.
Figure 11B:
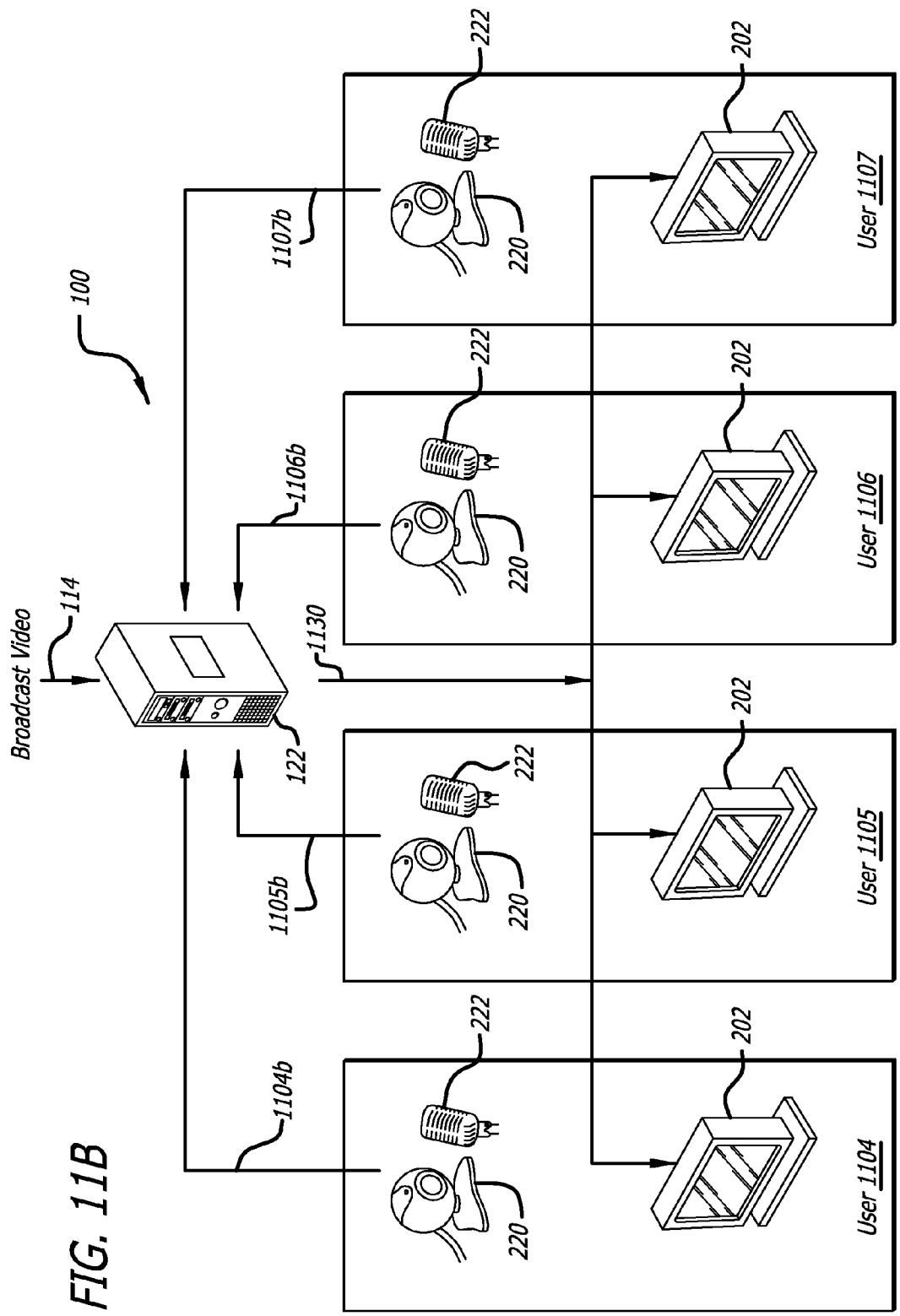
FIG. 11B is a schematic view illustrating how a combined audio/video stream is generated by a client application of the present invention.

When the user selects the "Enter FantasyLive" option 904, as illustrated in FIG. 11A, the application may display on the display screen 1100 of a display unit 202 (FIG. 2) (e.g., television screen) a main video image 1102 over a background 1103, and one or more picture-in-picture (PIP) user display windows 1104, 1105, 1106, 1107 superimposed, for example, over corners of the video image 1102. While the PIP display windows 1104, 1105, 1106, 1107 are described herein as being superimposed about the corners of the main video image 1102, persons skilled in the art will appreciate that the user display windows 1104 may be arranged in any suitable configuration.

The main video image 1102 may include, for example, a streaming or television broadcast video image of a live televised event, such as a football game. In this example, the user display windows 1104, 1105, 1106, 1107 (also known as "fan windows") correspond to network users that the user has selected in the "BoxSeats," "TheHole," and/or the "Fantasy League" option windows 502, 702 and 902 to simultaneously watch the broadcasted event with himself/herself.

In the "FantasyLive" mode, the user may communicate with other network users via the user display windows 1104, 1105, 1106, 1107 and webcam/microphone devices 222, 220 (FIG. 2) to create an interactive social experience. In particular, in one implementation of the invention shown in FIG. 11B, the user, also referred to herein as the "host user" 1104, may capture a video and audio of himself/herself and transmit the streaming video 1104b to the application server 122. The application server 122 receives the streamed video 1104b and combines it to the broadcast event 114 to produce a combined output stream 1130 that is broadcast to the plurality of user display windows 1104, 1105, 1106, 1107. The combined output stream 1130 is produced via a Flash encoder (FLV format) built into the client application. This process may be repeated for all the network users (e.g., 1105, 1106, 1107) such that the broadcast combined output stream contains streaming video/audio 1105b, 1106b, 1107b from all the network users.

Returning back to FIG. 11A, in this example, each user display window 1104, 1105, 1106, 1107 may include a "block" option 1108 to prevent a network user 1104, 1105, 1106, 1107 from communicating with the user, and a "mute" option 1110 to mute the audio feed from a selected network user. The "block" and "mute" options 1108 and 1110 may be selected by the user by highlighting the respective option buttons displayed below the user display windows 1104, 1105, 1106, 1107. In other implementations, each display window 1104, 1105, 1106, 1107 may also include, among others, volume control and private instant messaging features.

Figure 11C:
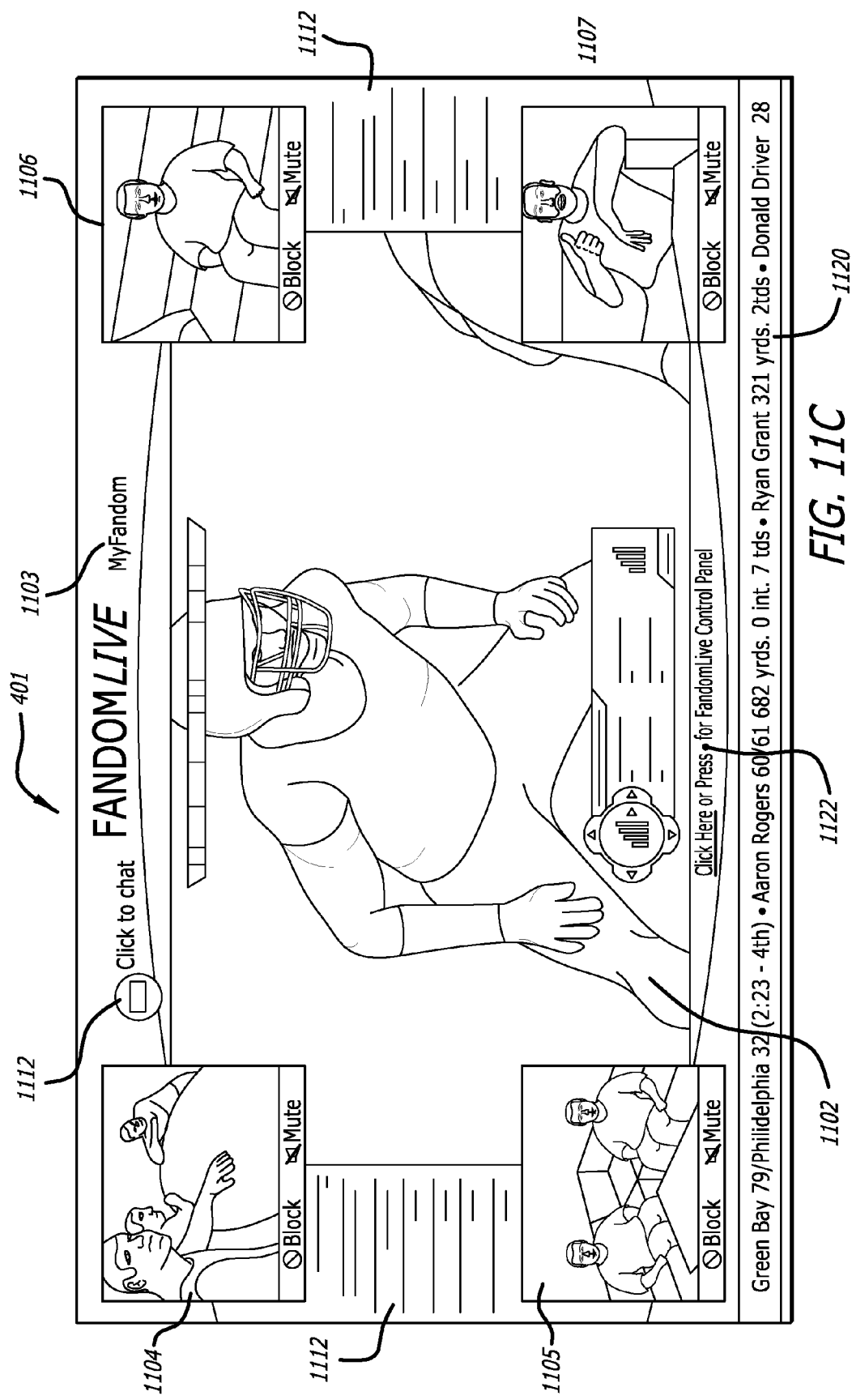
FIG. 11C illustrates another example of a display screen showing a main video window with a plurality of picture-in-picture user display windows in the FantasyLive feature of the client application of FIG. 3.

Optionally, as illustrated in FIG. 11C, real-time fantasy league statistics 1112 for a network user 1104, 1105, 1106, 1107 may be displayed against background 1102. Here, real-time statistics of various sporting events, for example football games, may be fed from various Internet sources such as news, sports, or fantasy sports websites or other social media to the application server 122 (FIG. 1) via an RSS feed (in RSS 2.0 format) and integrated with the broadcast video 114 (FIG. 1) to be displayed on the screen 401 of user display unit. The statistics 1112 font and graphics may be automated, for example, to zoom-in, zoom-out or change in scale and/or font size to indicate when updated statistics. In other implementations, real-time fantasy league statistics for the host user may be displayed on the user interface 1100, in addition to the fantasy league statistics for the other network users 1104, 1105, 1106, 1107.

In addition to video networking capabilities, the client application may enable the user to instant message or "chat" with another network user during a live event. Returning to the implementation of the present invention illustrated in FIG.

11A, a selectable "chat" option icon 1112 may be provided to enable the user to chat with other network users during an event.

Figure 12:
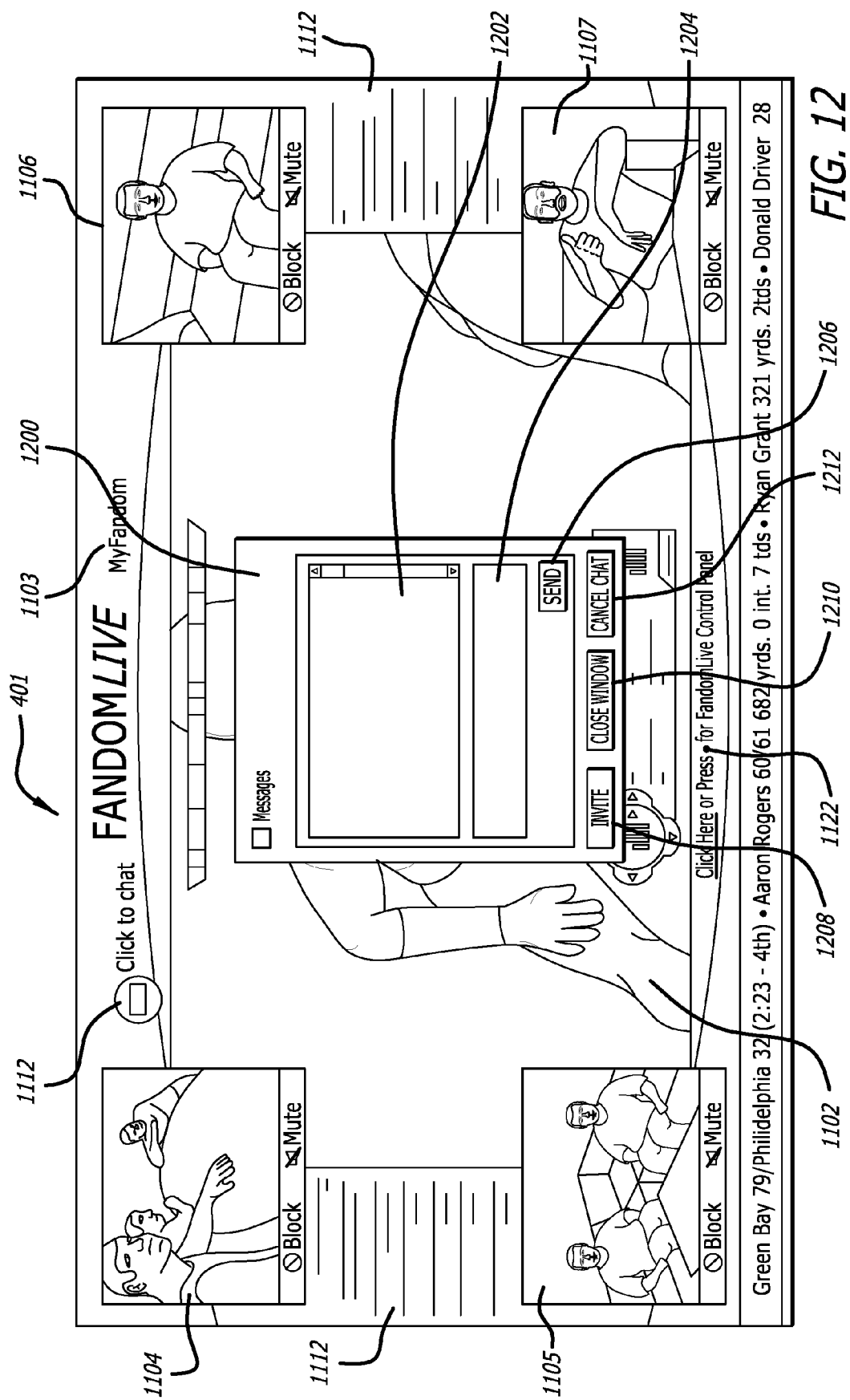
FIG. 12 illustrates another example of a display screen showing a main video window with a plurality of picture-in-picture user display windows and an instant messaging box in the FantasyLive feature of the client application of FIG. 3.

For instance, when the "chat" option icon 1112 is selected, an instant messaging (IM) window 1200 may be displayed over the main video image 1102, as illustrated in FIG. 12. The IM window 1200 depicts a chat session between the user and another network user during a broadcasted event. The instant messaging window 1200 may include a session window 1202 for displaying text messages, a text input field 1204 for entering text, and a "send" button 1206 for transmitting the user's message to a recipient. The IM window 1200 may also include an "invite" button 1208 for inviting other network users to join the chat session, a "close window" button 1210 for minimizing or closing the IM window 1200, and a "cancel chat" button 1212 for terminating the chat session. In accordance with the invention, the user may simultaneously open one or more chat sessions during a broadcasted event.

Returning now to FIG. 11A, a ticker display 1120 for scrolling, for example, real-time news updates and sports scores may be provided below the main video image 1102. In addition, a "Control Panel" option button 1122 may also be provided between the main video image 1102 and the ticker display 1120. By the selecting the option button 1122, the user may access a display panel for controlling various "FantasyLive" features and attributes.

Figure 13:
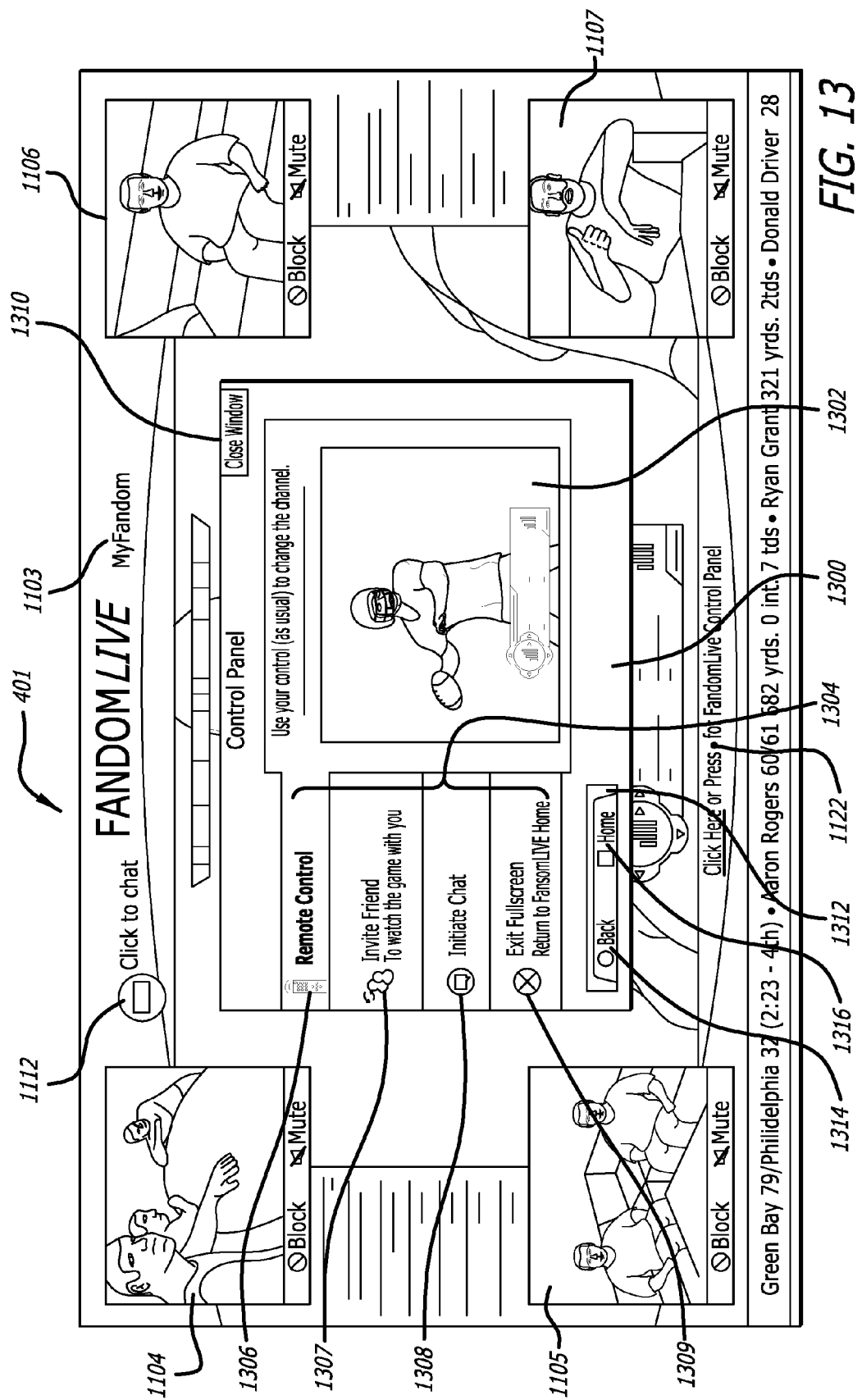
FIG. 13 illustrates one example of a display screen showing the Control Panel main menu of the FantasyLive menu of the client application of FIG. 3.

For example, as shown in FIG. 13, when the user selects the "Control Panel" option 1122, the client application may provide a control panel 1300 that includes a control window 1302 and a list of selectable control features 1304. The list of selectable control features 1304 may include, for example, a "Remote Control" feature 1306, an "Invite Friend" feature 1307, an "Initiate Chat" feature 1308, and an "Exit Fullscreen" feature 1309. The user may select a feature by highlighting the feature on the feature listing 1304 with a remote controller, cursor, or other selectable device. The control panel 1300 may also include a "Close Window" button 1310 for closing the control panel window 1300, and a navigation bar 1312. The navigation bar 1312 may include a "Back" button 1314 for enabling the user to return to a preceding control window, and a "Home" button 1316 for enabling the user to return to the control panel main menu screen.

When the user selects the "Control Panel" option 1122, the "Remote Control" feature 1306 appears as the default mode feature. In the "Remote Control" feature, as shown, the user may use a remote control to change, for example, the television channel of the broadcasted video image 1102. The television programming on the current channel may be displayed in the control window to provide the user the opportunity to view the television programming while scrolling through the channels.

Figure 14:
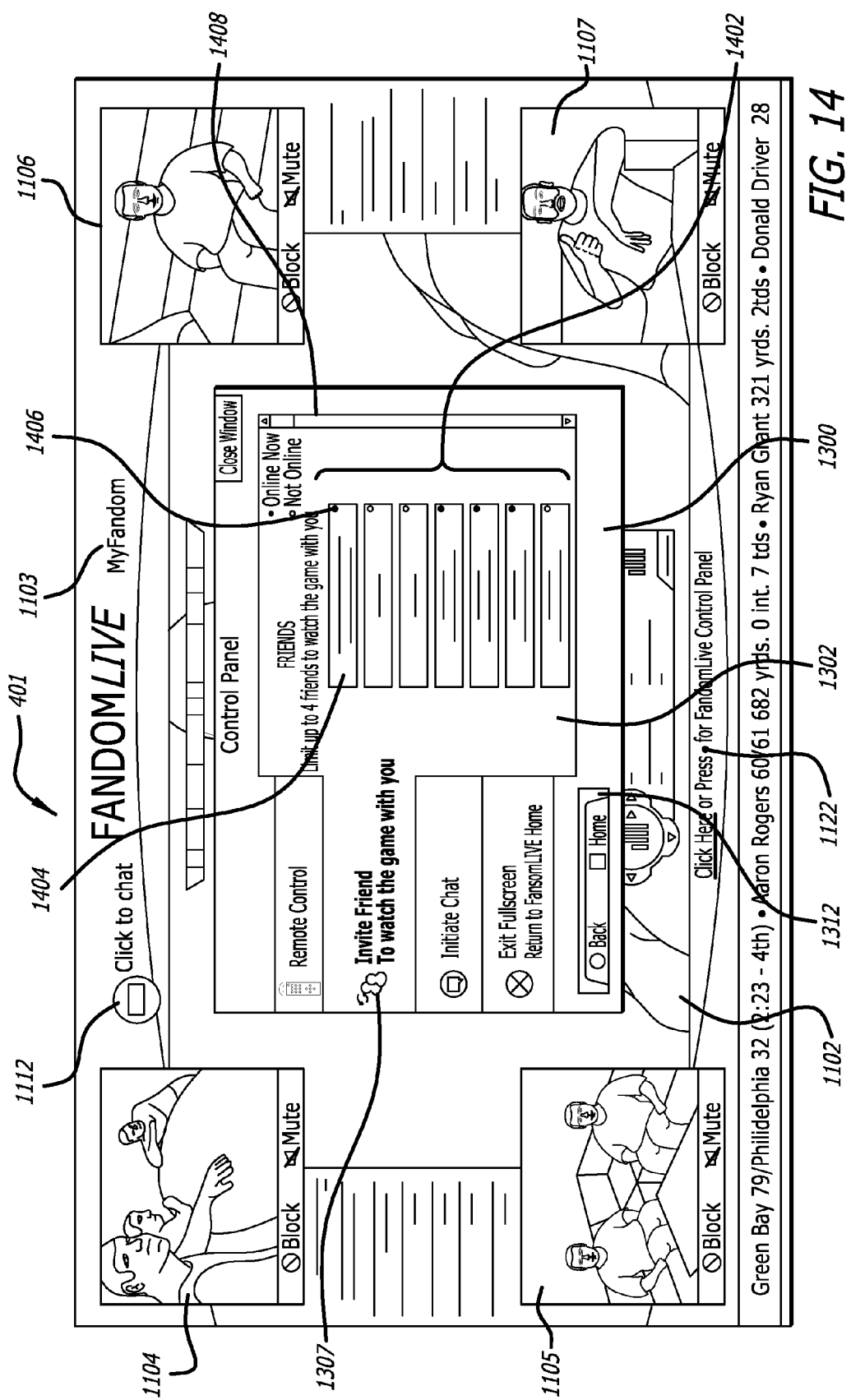
FIG. 14 illustrates one example of a display screen showing the Invite Friend mode in the FantasyLive option of the client application of FIG. 3.

If the user selects the "Invite Friend" feature 1307, the application may, for example, provide a listing of user friends 1402 in the control window 1302 that the user may invite to watch a broadcast event, as illustrated in FIG. 14. Each user friend may be identified by personal name or a username displayed on a button 1404 that the user may select by highlighting or clicking the button with a remote controller, cursor, or other selectable device. Each button 1404 may include a status indicator 1406 to identify whether a network user is currently logged onto (i.e., is "online") or logged off of the network. A scroll bar 1408 may appear along the right side of the control window 1302 to enable the user to scroll through the complete listing of user friends.

Figure 15:
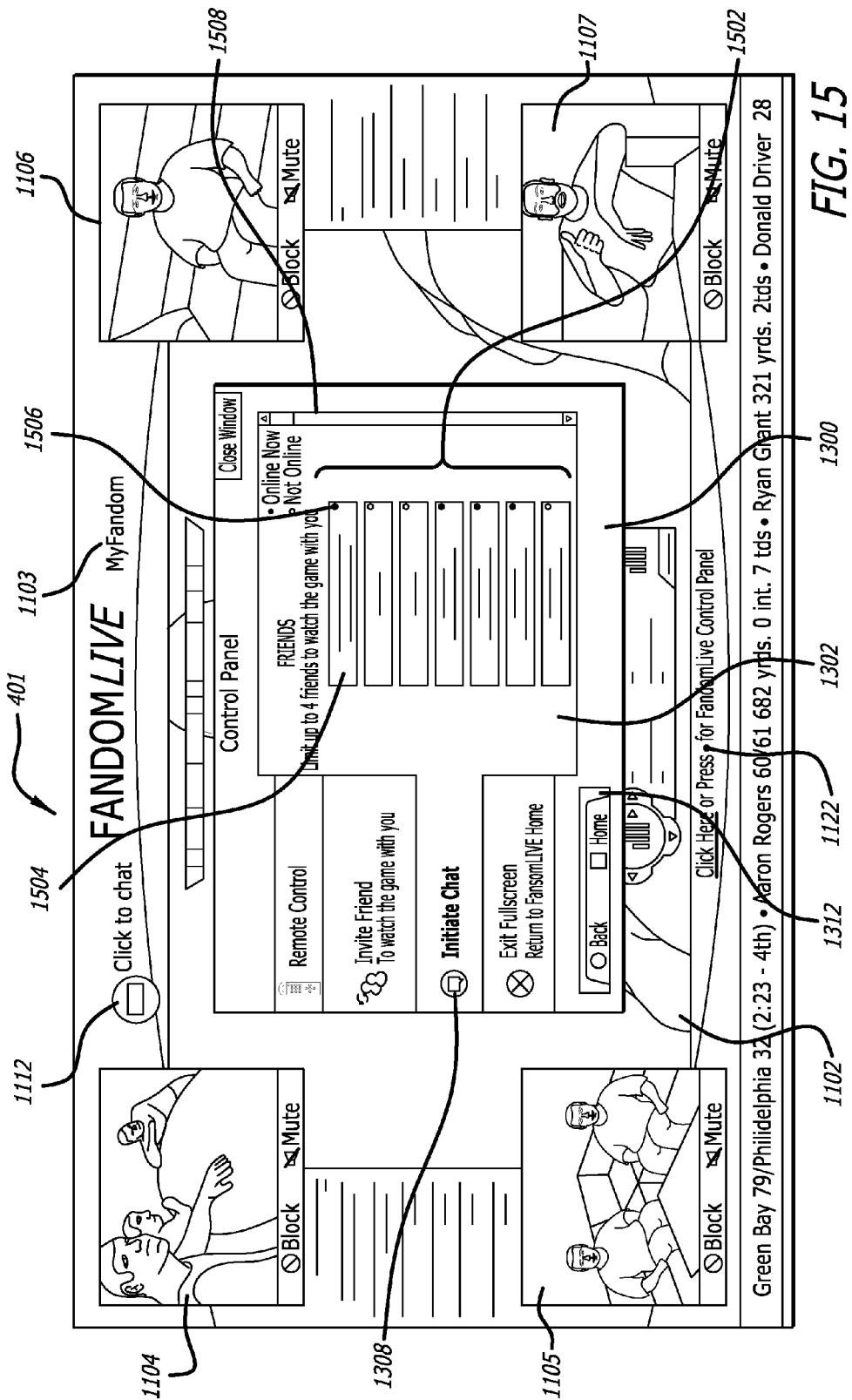
FIG. 15 illustrates one example of a display screen showing the Initiate Chat mode in the FantasyLive option of the client application of FIG. 3.

If the user selects the "Invite Chat" feature 1308, the application may, for example, provide a listing of user friends 1502 in the control window 1302 that the user may invite to participate in a chat session during a broadcast event, as illustrated in FIG. 15. Each user friend may be identified by personal name or a username displayed on a button 1504 that the user may select by highlighting or clicking the button with a remote controller, cursor, or other selectable device. Each button 1504 may include a status indicator 1506 to identify whether a network user is currently logged onto (i.e., is "online") or logged off of the network. A scroll bar 1508 may appear along the right side of the control window 1302 to enable the user to scroll through the complete listing of user friends.

If the user selects the "Exit Fullscreen" feature 1309, the application may, for example, prompt the user to select whether the user wants to return to the "FandomLive" home page. If the user selects the prompt, the user may be retuned back to the application main menu 400.

Figure 16:
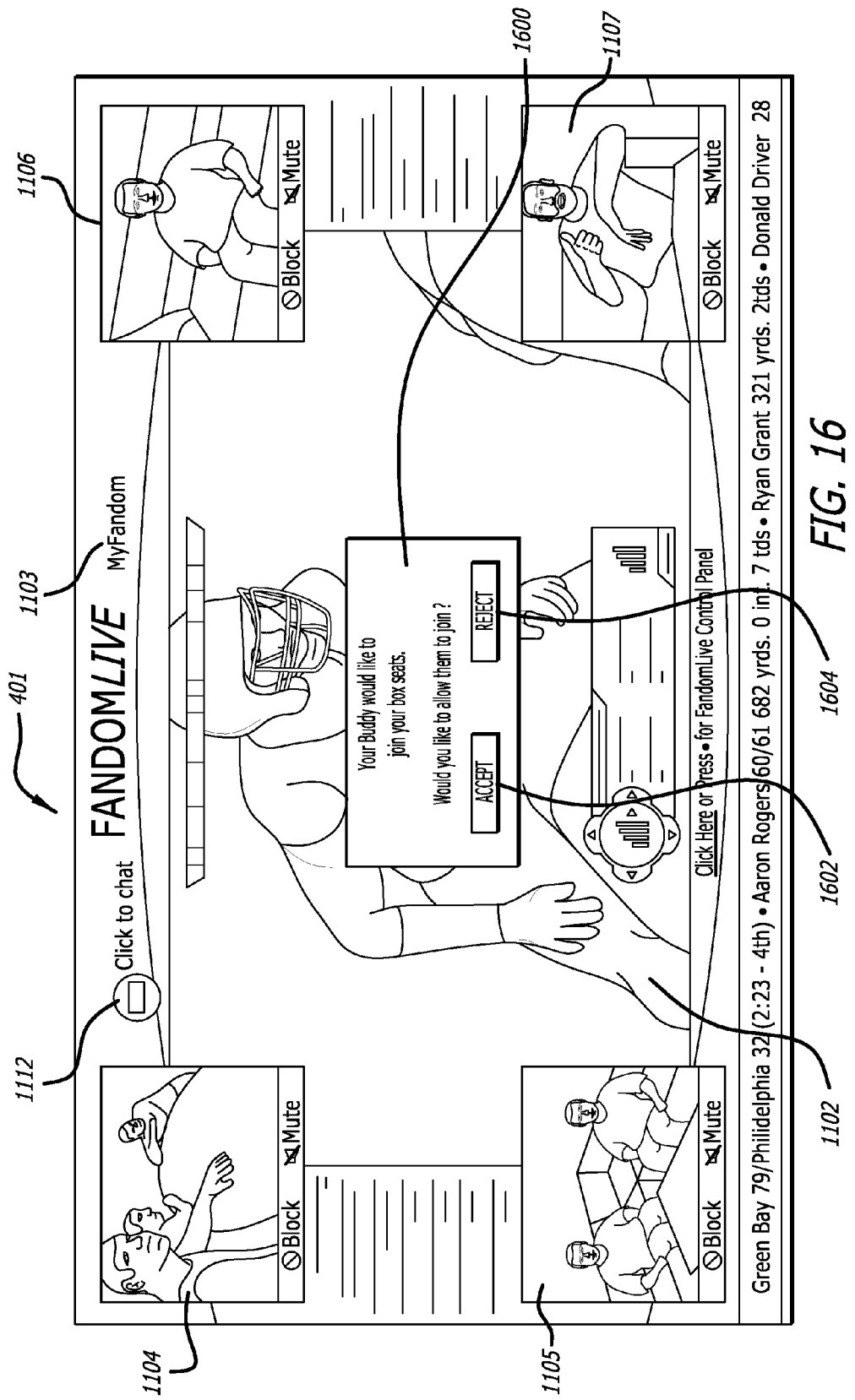
FIG. 16 illustrates one example of a display screen showing how end-user client may be invited to the join a network user's box seats in accordance with the present application.

As illustrated in FIG. 16, a pop-up window 1600 may appear on the display screen 401 of the user display unit 202 (FIG. 2) when another network user requests the user to join the requesting user's box seats as a "Friend." The pop-up window 1600 may prompt the user to "Accept" or "Reject" the request my selecting an "Accept" button 1602 or a "Reject" button 1604 displayed in the pop-up window 1600. If the user accepts the request, then the user is added to requesting user's box seats and the user's username and other information may be displayed in the requesting user's friends listing. If the user rejects the request, then the requesting user may be informed, for example, that the user's box seats is full, the request has been rejected, or the requesting user may receive a customized reply message created by the user.

Figure 17:
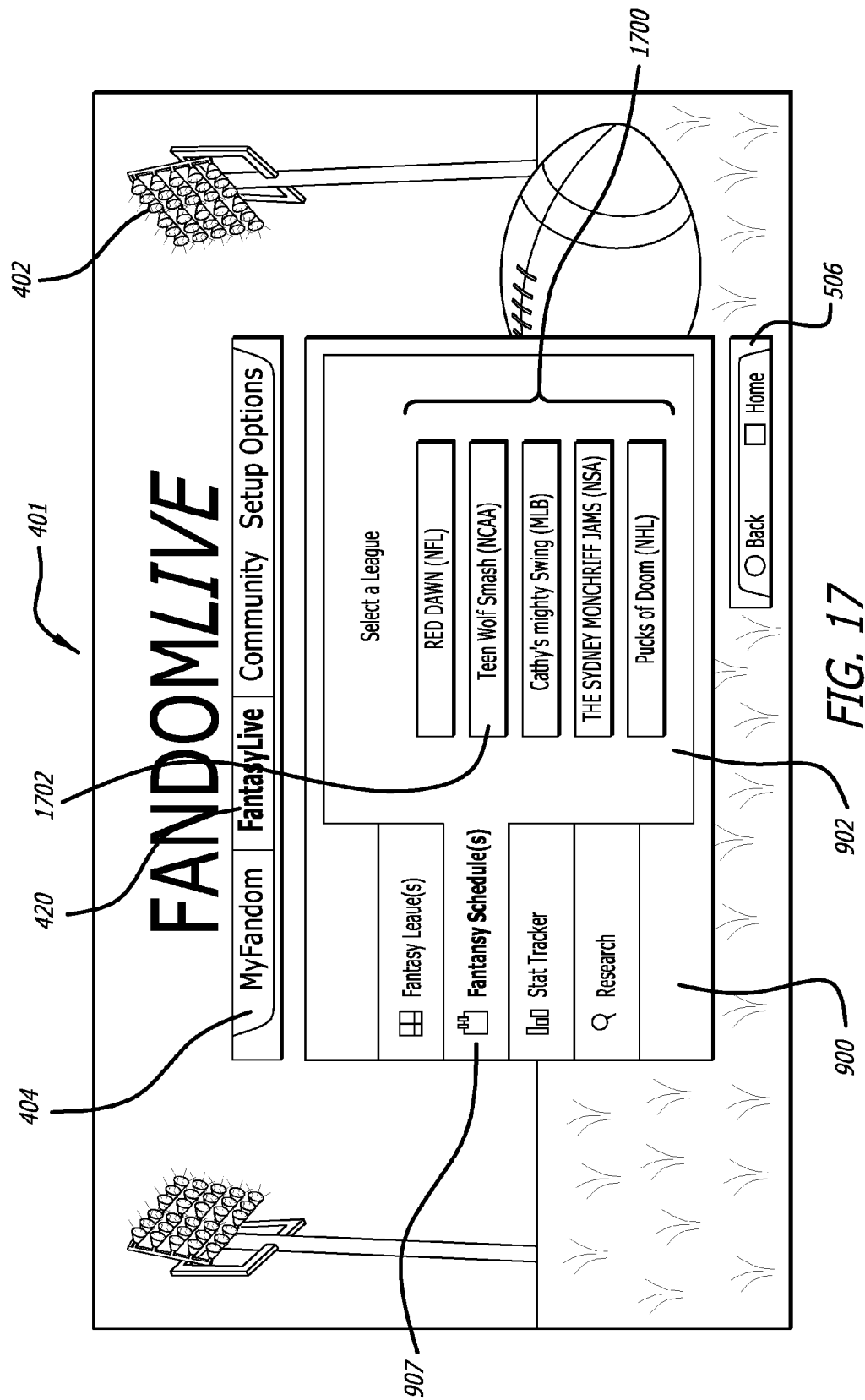
FIG. 17 illustrates one example of a display screen showing the Select a League menu in the Fantasy Schedule(s) mode of the FantasyLive feature of the client application of FIG. 3.

FIG. 17 illustrates one example of an implementation of the "Fantasy Schedule(s)" mode 907 of the FANTASYLIVE application feature 420. As shown, in the "Fantasy Schedule (s)" mode 907, the application may, for example, provide in the option window 902 a listing of fantasy sports leagues 1700 to which the user belongs. From this listing 1700, the user may select which fantasy league the user desires to follow. Each fantasy league may be depicted by team name displayed on a selectable button 1702 that the user may select by highlighting or clicking or clicking the button with a remote controller, cursor, or other selectable device. When the user selects a particular fantasy league, player, statistical, and other information pertaining to the selected fantasy league is displayed in the option window 902. Such information may include, for example, the user's team information, league ranking, and other league member information.

Figure 18:
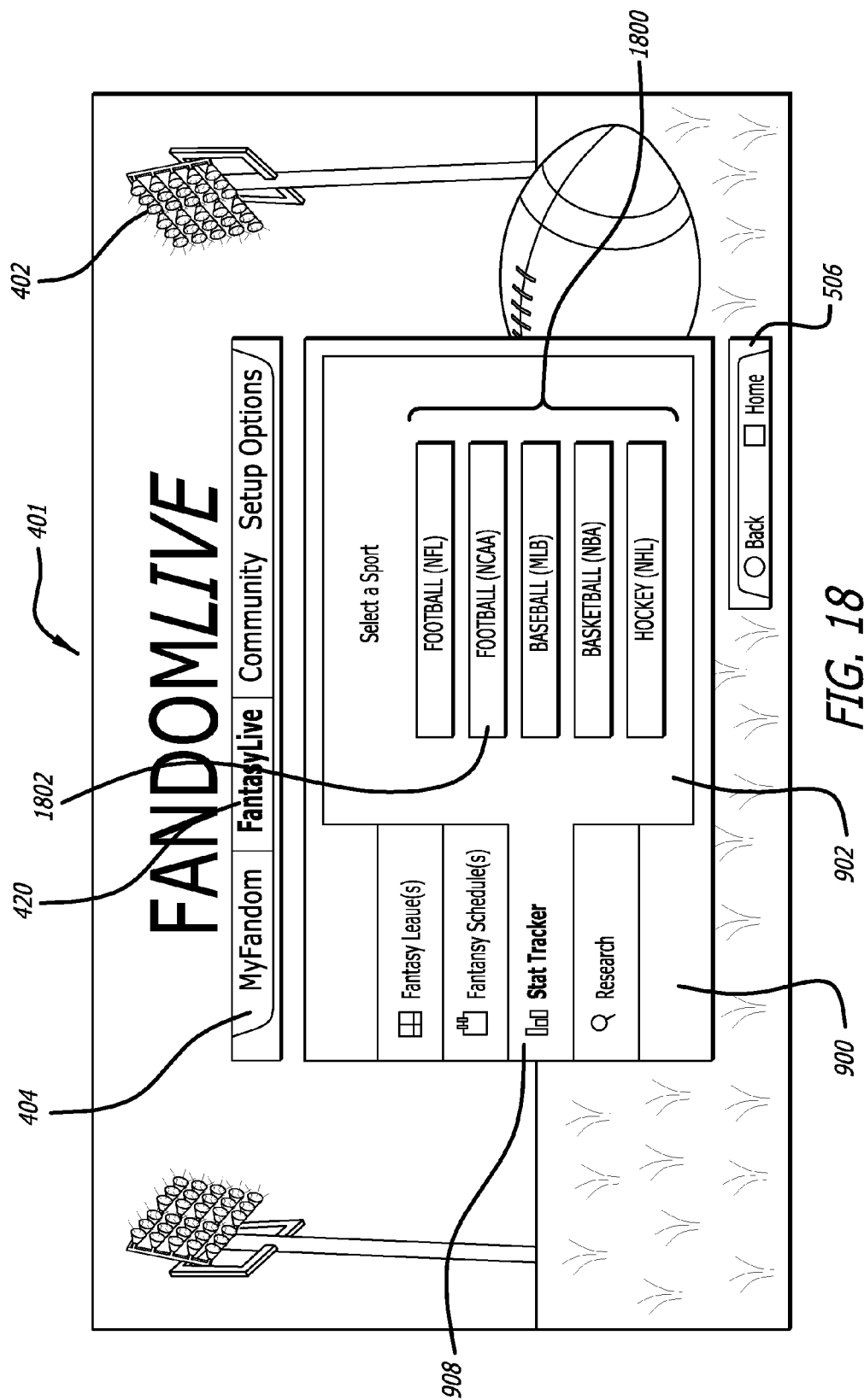
FIG. 18 illustrates one example of a display screen showing the Select a Sport menu in the Stat Tracker mode of the FantasyLive feature of the client application of FIG. 3.
Figure 19:
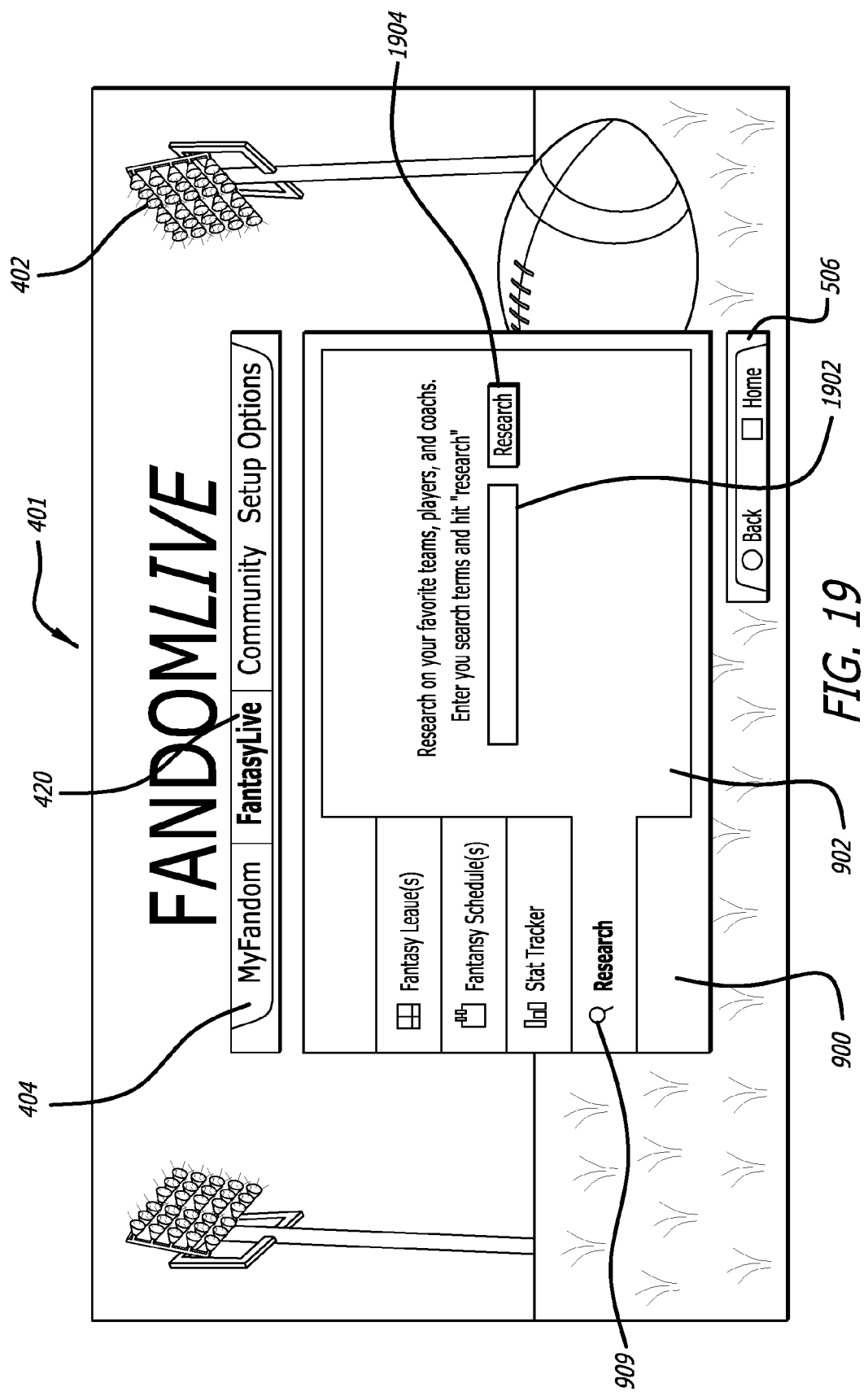
FIG. 19 illustrates one example of a display screen showing how an end-user client may search for sports information using the client application of FIG. 3.

FIG. 18 illustrates one example of an implementation of the "Stat Tracker" mode 908 of the FANTASYLIVE application feature 420. As shown, in the "Stat Tracker" mode 908, the application may, for example, provide in the option window 902 a listing of sporting events 1800 where the user may obtain certain statistical information such as preview summaries, box scores, game summaries, schedules, standings, rankings, player and team statistics, highlights, and other information. From this listing 1800, the user may select the sport of interest. Each sport may be depicted by team name displayed on a selectable button 1802 that the user may select by highlighting or clicking the button with a remote controller, cursor, or other selectable device. When the user selects a particular sport, player, league, statistical, and other information pertaining to the fantasy leagues for the selected sport is displayed in the option window 902. Such information may include, for example, league rankings, top players for the week, and details of upcoming games.

When the user selects the "Research" feature mode 909, a text input field 1902 for entering text and a "Research" button 1904 for transmitting a search request to, for example, a global network may be provided in the option window 902. In the "Research" mode, the user may search for, among other things, a particular sports team, player, or coach. Once a search request is sent by the user, the results are displayed in the option window 902 in hyperlinked headlines format (with a 55 word story tag). The user may click or otherwise select a headline to, for example, read an article in full format in the option window 902.

C. Community Feature

A third application feature of the client application of the present invention may include the COMMUNITY application feature 430. The COMMUNITY application feature enables the user to access news and social media concerning, for example, sports.

Figure 20:
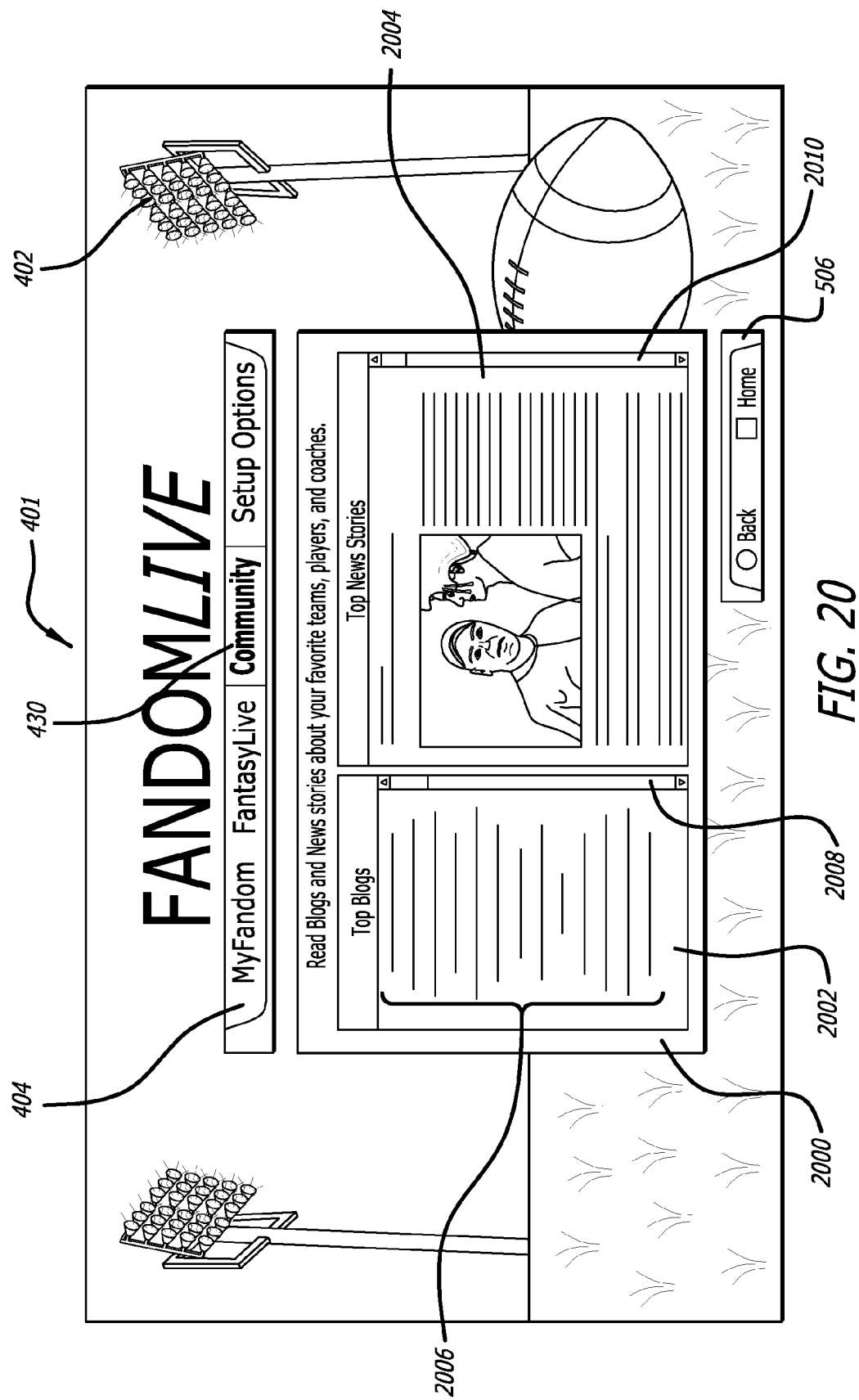
FIG. 20 illustrates one example of a display screen showing how a user may access sports blogs, new articles, and other sports information using a client application the client application of FIG. 3.

As illustrated in FIG. 20, in the COMMUNITY application feature, a main menu window 2000 containing first and second display windows 2002 and 2004 is provided. In this example, the first display window 2002 may display certain social media, such as a listing of Internet blogs 2006. In this window, the Internet blogs may be listed by topic or title, which may be hyperlinked, and the user may access a particular Internet blog by highlighting or clicking the topic or title with a remote controller, cursor, or other selectable device. When an Internet blog is selected by the user, the full text of the blog is fed to the application via an FSS feed and displayed, for example, in the first window 2002. A scroll bar 2008 may appear along the right side of the first display window 2002 to enable the user to scroll through the complete Internet blog listing.

In the same way, the second display window 2004 may, for example, display news articles and other information. In this window, headline news articles, for example, may be listed by title, which may be hyperlinked, and the user may access a particular news article by highlighting or clicking the title with a remote controller, cursor, or other selectable device. When a news article is selected by the user, the full text of the article is, likewise, fed to the application via an FSS feed and displayed, for example, in the second window 2004. A scroll bar 2010 may appear along the right side of the second display window 2004 to enable the user to scroll through the complete article. While news articles and Internet blogs are described herein as being displayed in display windows 2002 and 2004, persons skilled in the art will appreciate that other information, social, and news reporting media may be displayed in display windows 2002 and 2004.

D. Setup Options Feature

A second application feature of the client application of the present invention may include the SETUP OPTIONS application feature 440. The SETUP OPTIONS application feature enables the user to enter and change certain stored user information and adjust certain system attributes.

Figure 21:
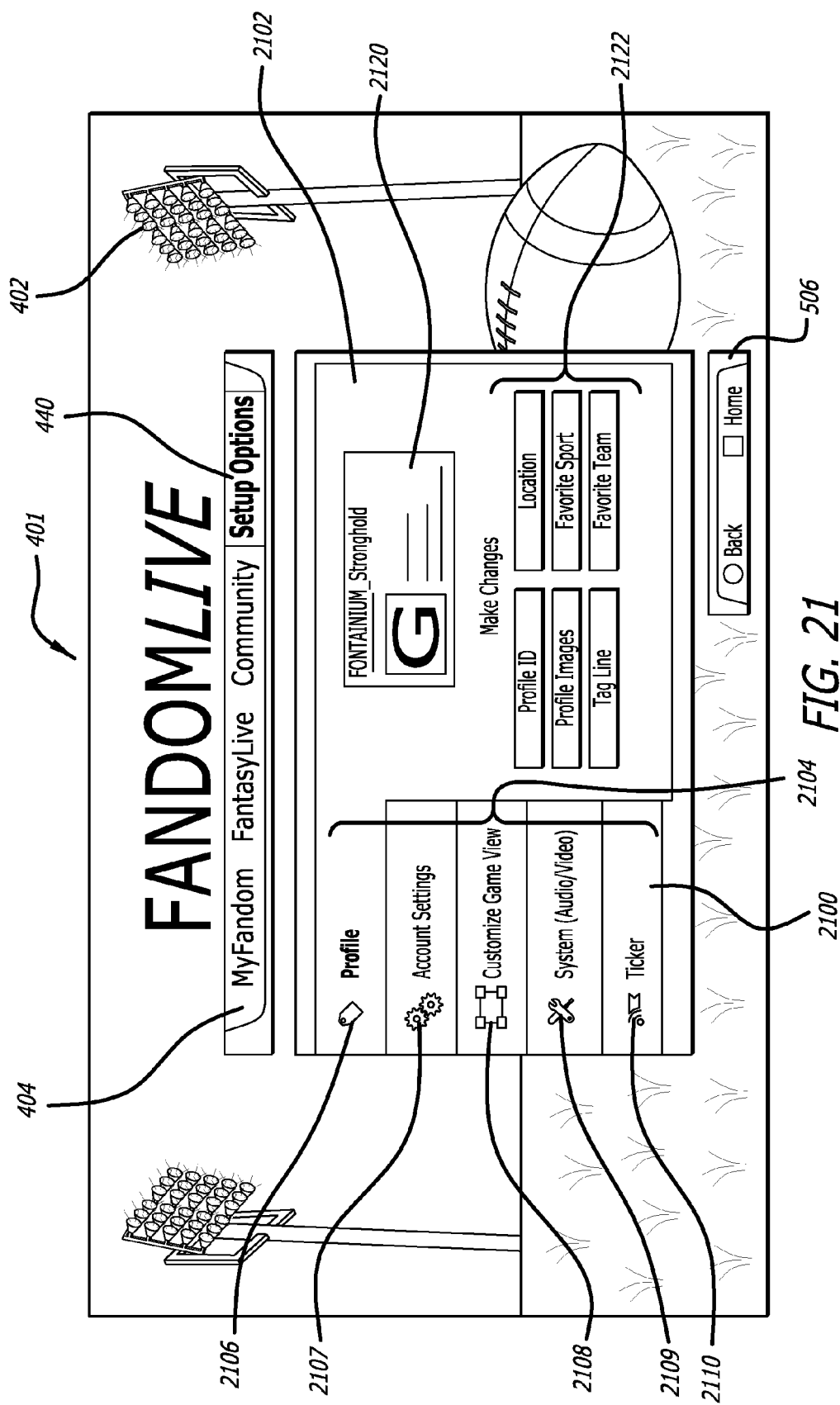
FIG. 21 illustrates one example of the SETUP OPTIONS main menu screen of the client application of FIG. 3.

As illustrated in FIG. 21, when the user selects the SETUP OPTIONS feature 440, a main menu window 2100 may be displayed that includes an option window 2102 and a list of selectable mode features 2104. The list of selectable mode features 2104 may include, for example, a "Profile" mode feature 2106, an "Account Settings" mode feature 2107, a "Customize Game View" mode feature 2108, a "System" mode feature 2109, and a "Ticker" mode feature 2110. When the user selects the SETUP OPTIONS application feature 440, the "Profile" mode feature 2106 appears as the default mode feature.

In the "Profile" mode feature 2106, the user may create or change a user profile. As shown, in the "Profile" mode feature 2106 a graphic 2120 and a series of selectable option button 2122 may appear in the option window 2102. The graphic 2120 may depict certain stored profile information about the user such as, for example, the user's username, tag line, location, favorite sport, and favorite sports team. In addition to user information, the graphic may also display an image of the user or a logo of the user's favorite sports team.

As shown, the series of selectable option button 2122 may include, for example, a "Profile ID" option button, a "Profile Image" option button, a "Tag Line" option button, a "Location" option button, a "Favorite Sport" option button, and a "Favorite Team" option button. By selecting one or more of these option buttons 2122, text fields may appear to enable the user enter or change profile information about himself/herself. This information may include, for example, the user's username or profile ID, famous tag line, resident location, favorite sport, favorite sports team. In addition, the user may also upload an image of himself/herself or the logo of the user's favorite sports team, for example. Once the profile information is entered or changed by the user, the profile information may be stored in a user data file on the system database 128 (FIG. 2).

Figure 22:
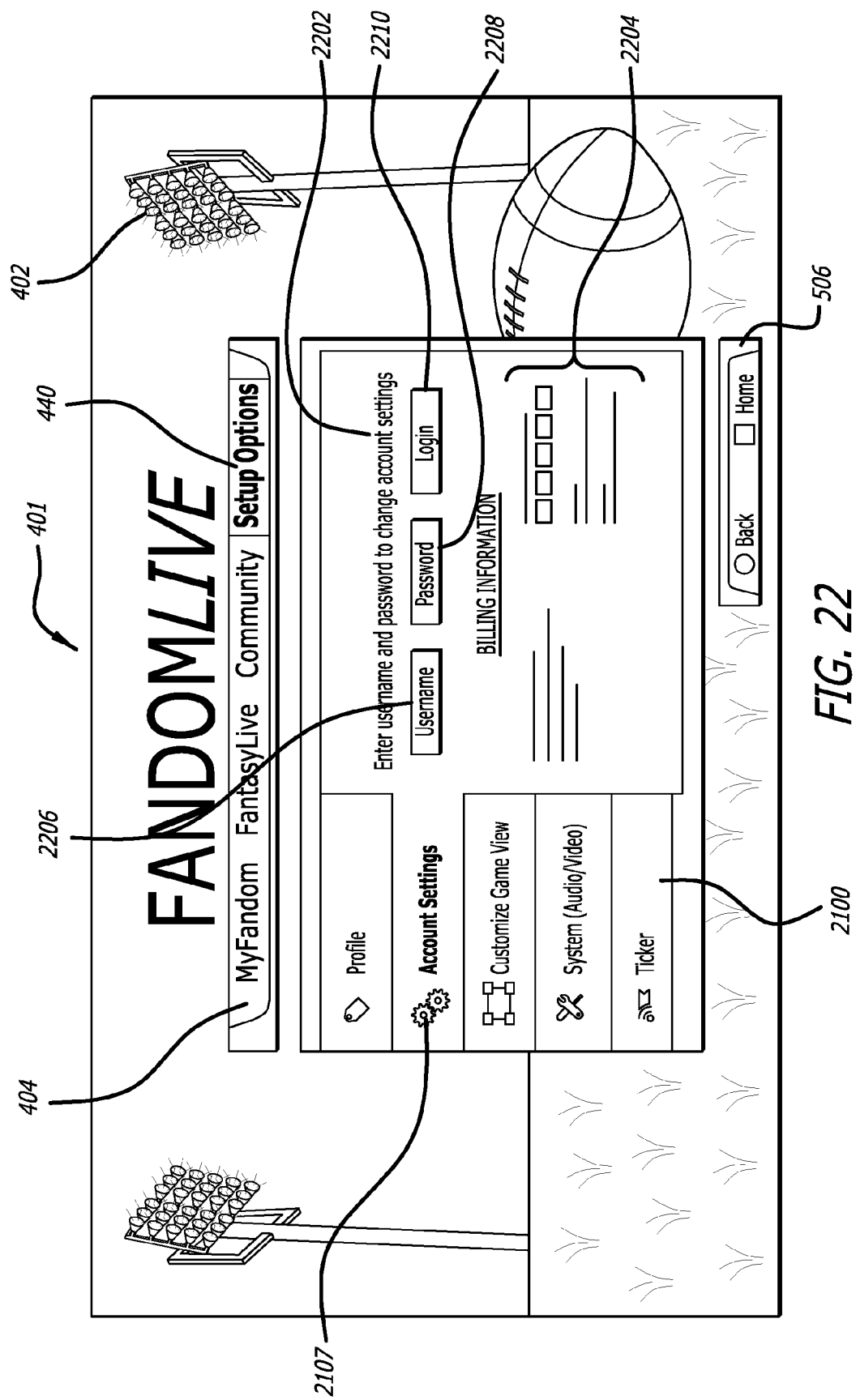
FIG. 22 illustrates one example of a display screen showing the Account Settings mode of the Setup Options feature of the client application of FIG. 3.

In the "Account Settings" mode feature 2107, the user may provide or update certain billing information pertaining to the user. As shown in FIG. 22, when the user selects the "Account Settings" mode feature 2107 a login field 2202 and a region 2204 displaying certain stored billing information pertaining to the user may appear in the option window 2102. The login field 2202 may include text fields 2206 and 2208 for entering the user's username and password. A selectable "Login" button 2210 is provided that, once the appropriate username and password is entered in the test fields 2206 and 2208, permits the user to "login" to a billing portal where the user may access his/her billing information. Once logged in, a series of data fields are provided where the user may input and/or change his/her billing information including, for example, name, billing address, type of credit card, credit card number, credit card security code, and expiration date. Once the billing information is entered or changed by the user, the billing information may be stored in a user data file on the system database 128 (FIG. 2).

The region 2204 displaying billing information may provide, for example, the user's name, billing information, redacted credit card information, and date through which the user's account payments are current.

Figure 23:
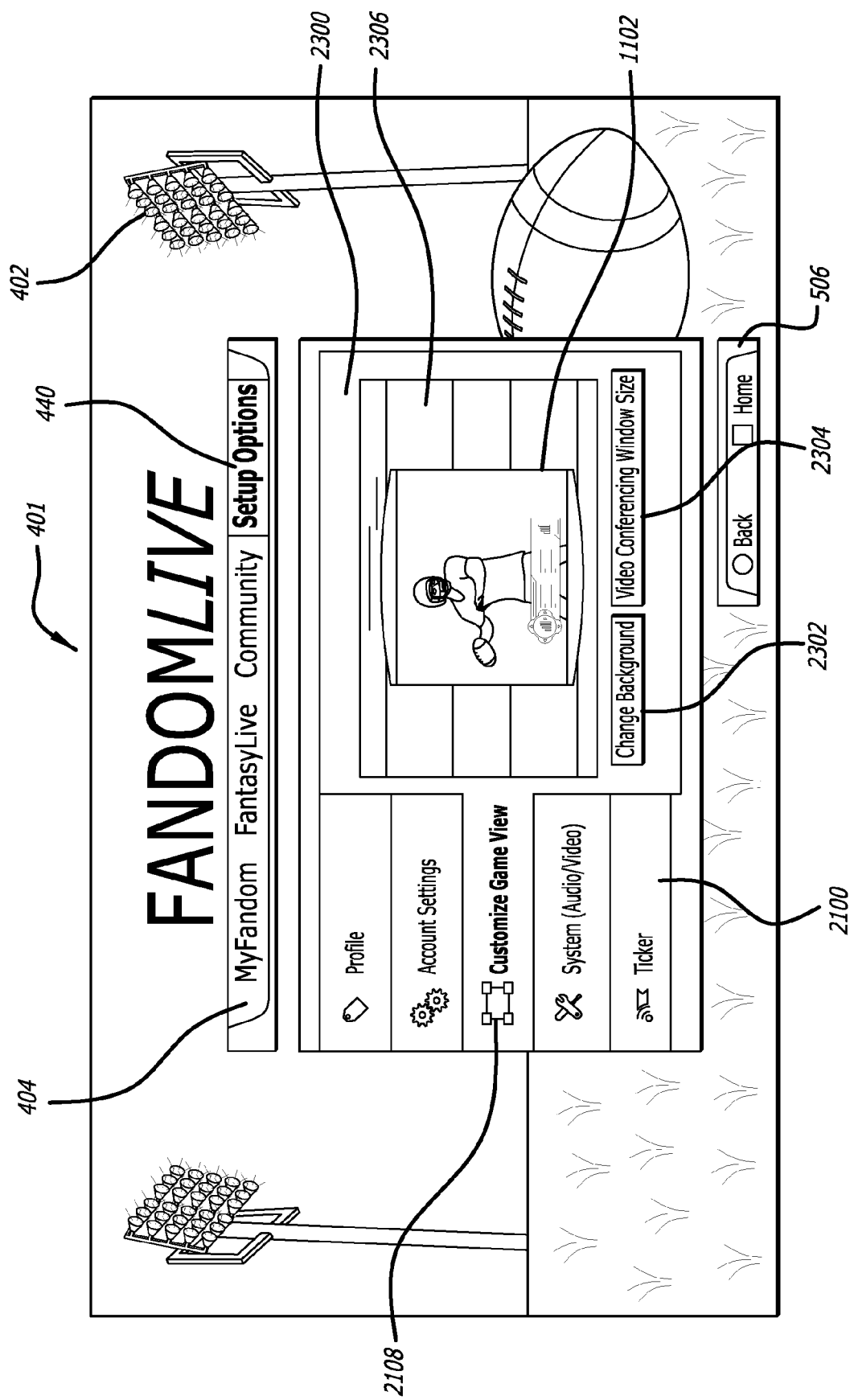
FIG. 23 illustrates one example of a display screen showing the Customize Game View mode of the Setup Options feature of the client application of FIG. 3.
Figure 24:
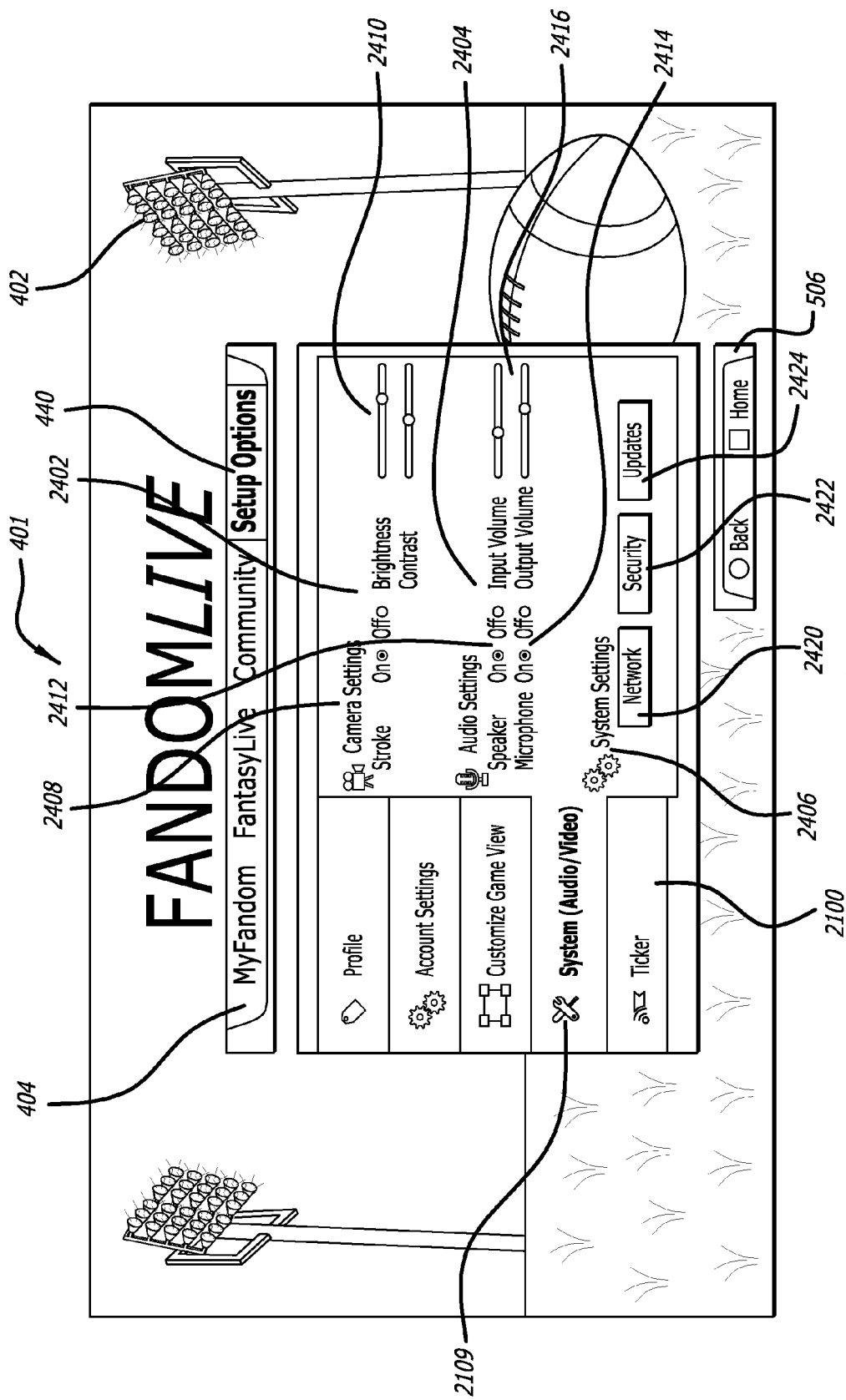
FIG. 24 illustrates one example of a display screen showing the System mode of the Setup Options feature of the client application of FIG. 3.

In the "Customize Game View" mode feature 2108, the user may customize the background graphics and configuration of the display screen. As shown in FIG. 23, when the user selects the "Customize Game View" mode feature 2108 a video window 2300 displaying a reduced image of the display screen, and selectable option buttons 2302 and 2304 may appear in the option window 2102. Option button 2302 may include a "Change Background" option and option button 2304 may include a "Video Conferencing Window Size" option. Option buttons 2302 and 2304 may be selected by the user by highlighting or clicking the button with a remote controller, cursor, or other selectable device.

By selecting the "Change Background" option 2302, the user may scroll through a series of stored background images. Once a desired background image is selected by the user, a selected background image 2306 may appear against a depicted video image 2308 in the video window 2300.

By selecting the "Video Conferencing Window Size" option 2304, the user may be provided with a control panel that enables the user to resize and adjust the position where the user display windows 1104, 1105, 1106, 1107 will appear on the display screen (FIG. 11A).

In the "System" mode feature 2109, the user may adjust certain camera, audio, and system settings. As shown in FIG.

24, when the user selects the "System" mode feature 2109 a camera settings field 2402, an audio setting field 2404, and a system setting field 2406 may appear in the option window 2102. The camera settings field 2402 may include a set of "On/Off" radio buttons 2408 controlling the status of the camera feeds, and slidable controls 2410 for adjusting the brightness and contrast of the images displayed in the user display windows 1104, 1105, 1106, 1107. The audio settings field may include a set of "On/Off" speaker status buttons 2412, a set of "On/Off" microphone status buttons 2414, and slidable controls 2418 for adjusting the input and output levels of the user speakers and microphone.

The system settings field 2406 may include a set of selectable option buttons 2420, 2422, 2424. Option button 2420 may be selected by the user to, for example, control various network settings. Option button 2422 may be selected by the user to, for example, adjust the system security settings. Option button 2424 may be selected by the user to, for example, download any system software updates.

Figure 25:
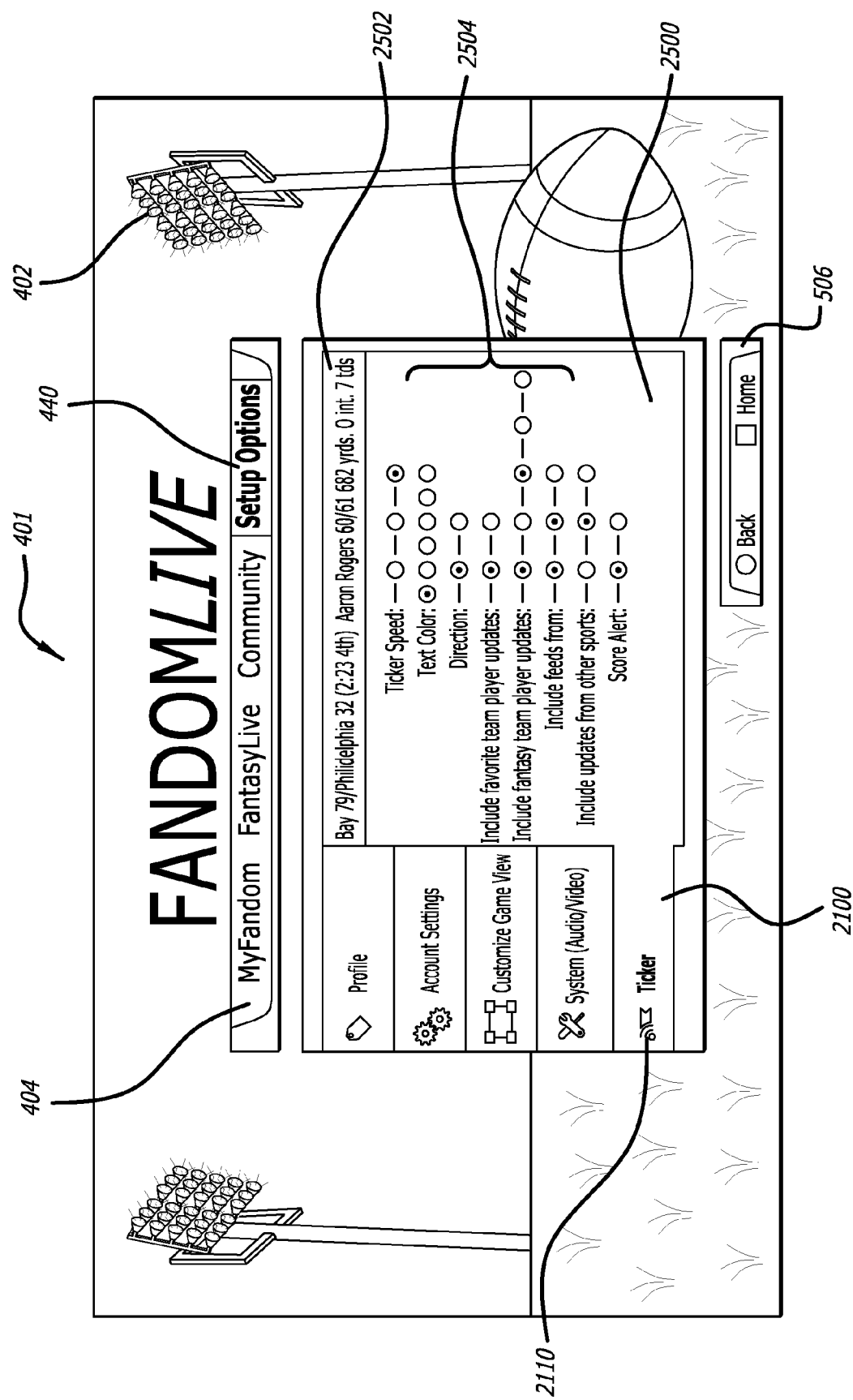
FIG. 25 illustrates one example of a display screen showing the Ticker mode of the Setup Options feature of the client application of FIG. 3.

In the "Ticker" mode feature 2110, the user may adjust certain attributes of the scrolling ticker 1120 (FIG. 11A). As shown in FIG. 25, when the user selects the "Ticker" mode feature 2110 an image of the scrolling ticker 2502 and a series of control radio buttons 2504 for adjusting the scrolling ticker attributes may appear in the option window 2500. The ticker attributes to be adjusted by the user may include ticker speed, text color, scrolling direction, score update preferences (including sport, sports teams, and players), RSS feed sources (e.g., espn.com, cbssports.com, sports.yahoo.com), and score alerts.

The above illustrated example, in connection with FIGS. 3-25, illustrates the use of the client application of the present invention in connection with a television system that broadcasts live televised events. In other implementations, the client application of the present invention may be applied to a global network that streams live and pre-recorded audio of audio/video media or content. In additional implementations, the client application of the present may be used in connection with a network of video gaming users to create an interactive social network.

In addition, while the examples herein describe a "broadcast event" as a telecasted live sports event, persons skilled in the art will appreciate that a "broadcast event" may also include a live or pre-recorded, televised or streamed musical or theatrical performance. In accordance with the principles of the present invention, a "broadcast event" may also include the display of audio/visual media or content from any source.

In general, terms such as "communication" and in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

Although the previous description only illustrates particular examples of various implementations, the invention is not limited to the foregoing illustrative examples. A person skilled in the art is aware that the invention as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An interactive video system comprising:
a host, wherein the host receives a plurality of audio/visual (A/V) streams from an event broadcaster coupled to the host and a plurality of clients coupled to the host,
wherein the event broadcaster is separate from the host,
wherein the event broadcaster produces an event broadcast, wherein the event broadcast is part of the plurality of A/V streams,
wherein the event broadcast is directly transmitted from the event broadcaster to the plurality of clients, and
wherein the host includes
a database server and
an application server,
wherein the host is configured to combine at least a portion of the plurality of A/V streams to produce a combined A/V stream, and
wherein the host is configured to transmit the combined A/V stream to at least one of the plurality of clients for simultaneous presentation of the combined A/V stream with the event broadcast on a display device at the at least one client.

2. The interactive video system of claim 1, wherein the plurality of A/V streams of the combined A/V stream are superimposed on the A/V stream for the event broadcast as respective conferencing windows.

3. The interactive video system of claim 2,
wherein the host receives the A/V stream for the event broadcast, and
wherein the combined A/V stream includes at least a portion of the A/V stream for the event broadcast.

4. The interactive video system of claim 3, wherein the A/V stream for the event broadcast includes an A/V stream for a televised event broadcast.

5. The interactive video system of claim 1, wherein the host is configured to
connect a first client of the plurality of clients to a second client of the plurality of clients, wherein the first client and second client are both coupled to the host,
produce a first combined A/V stream including an A/V stream received at the host from the first client,
produce a second combined A/V stream including an A/V stream received at the host from the second client,
transmit the first combined A/V stream to the second client, and
transmit the second combined A/V stream to the first client.

6. The interactive video system of claim 5, wherein the host is further configured to connect the first client to the second client in response to receipt of a request from the first client or the second client.

7. The interactive video system of claim 1,
wherein the host is further configured to receive a data feed, and
wherein the combined A/V stream produced by the host includes data from the data feed received at the host.

8. The interactive video system of claim 7, wherein the data feed is an RSS feed.

9. The interactive video system of claim 1, wherein the host is further configured to store in a storage module information related to the plurality of clients coupled to the host and information related to event broadcasts displayed at a display device of each of the plurality of clients.

10. A non-transitory computer-readable storage medium with software stored thereon for presenting an interactive video display, wherein the software is configured to instruct one or more processing devices to perform steps comprising:
receiving an first audio/visual ("A/V") stream at a host from an event broadcaster, wherein the first A/V stream is part of an event broadcast which is broadcast by the event broadcaster;
receiving a second A/V stream at the host from a first client of a plurality of clients, wherein the plurality of clients are coupled to the host; and
transmitting a combined A/V stream to a second client of the plurality of clients,
wherein the event broadcaster is separate from the host, wherein each client is configured to receive an event broadcast A/V stream from the event broadcaster directly,
wherein the combined A/V stream includes the first A/V stream and the second A/V stream,
wherein the combined A/V stream is configured to be presented on a display device at the second client, and
wherein the second A/V stream is presented in a respective conferencing window on the display device simultaneous with the first A/V stream.

11. The non-transitory computer-readable storage medium of claim 10, wherein the event broadcast is a televised event broadcast.

12. The non-transitory computer-readable storage medium of claim 10, wherein the software is further configured to instruct the one or more processing devices to perform a step including transmitting a communication to the host, the request including
a request to connect to a client coupled to the host, and
a request to receive, in the combined A/V stream, an A/V stream transmitted to the host from the client coupled to the host.

13. The non-transitory computer-readable storage medium of claim 10, wherein the software is further configured to instruct the one or more processing devices to perform a step including adjusting at least one of a position, a size, and a volume of the conferencing window presented at the display device.

14. The non-transitory computer-readable storage medium of claim 10,
wherein the combined A/V signal further includes data of a data feed received at the host and
wherein the software is further configured to instruct the one or more processing devices to perform a step including presenting, on the display device, the data of the data feed simultaneous with the event broadcast.

15. The non-transitory computer-readable storage medium of claim 14, wherein the data feed is an RSS feed.

16. The non-transitory computer-readable storage medium of claim 10, wherein the software is further configured for storage on a communication device coupled to the display device at the client and wherein the software is further configured to instruct one or more processing devices to perform steps including
transmitting to the host information related to the client for storage at the host and
transmitting to the host information related to event broadcasts displayed at the display device of the client for storage at the host.

17. A method of presenting an interactive video display comprising:
receiving a plurality of audio/visual (AN) streams at a host from a plurality of clients coupled to the host and an event broadcast from an event broadcaster,
wherein the event broadcaster is separate from the host and
wherein each client of the plurality of clients is configured to receive the event broadcast from the event broadcaster directly;
combining at least a portion of the plurality of AN streams and the event broadcast to produce a combined A/V stream; and
transmitting the combined A/V stream to at least one of the plurality of clients for simultaneous presentation of the combined A/V stream with an event broadcast on a display device at the at least one plurality of clients.

18. The method of claim 17, further including superimposing the plurality of A/V streams of the combined A/V stream on an A/V stream for the event broadcast as respective conferencing windows.

19. The method of claim 17, further including
receiving at the host the A/V stream for the event broadcast and
including at least a portion of the A/V stream for the event broadcast in the combined A/V stream produced.

20. The method of claim 19, wherein the A/V stream for the event broadcast comprises an A/V stream for a televised event broadcast.

21. The method of claim 17, further including
associating a first client coupled to the host with a second client coupled to the host,
producing a first combined A/V stream including an A/V stream received at the host from the first client,
producing a second combined A/V stream including an A/V stream received at the host from the second client,
transmitting the first combined A/V stream to the second client, and
transmitting the second combined A/V stream to the first client.

22. The method of claim 21, wherein the first client is connected to the second client in response to receipt of a request at the host from the first client or the second client.

23. The method of claim 17, further including
receiving a data feed and
including data from the data feed in the combined A/V stream produced.

24. The method of claim 23, wherein the data feed is an RSS feed.

25. The method of claim 17, including
storing in a storage module information related to the plurality of clients coupled to the host and
storing in the storage module information related to event broadcasts displayed at the display device of each of the plurality of clients.

* * * * *